(12) United States Patent
Rao et al.

(10) Patent No.: US 12,489,540 B2
(45) Date of Patent: Dec. 2, 2025

(54) SYSTEMS AND METHODS FOR ENABLING POINT-TO-MULTI-POINT APPLICATIONS IN COMMON MANAGEMENT INTERFACE SPECIFICATION

(71) Applicant: Infinera Corp., San Jose, CA (US)

(72) Inventors: Rajan Rao, Fremont, CA (US); Steven Joseph Hand, Los Gatos, CA (US); Jeng Rong Yeh, San Mateo, CA (US); Vasudha Bhaskara, Milpitas, CA (US); Anders Wikman, Årsta (SE); Mats Plantare, Stockholm (SE)

(73) Assignee: Infinera Corp.

( * ) Notice: Subject to any disclaimer, the term of this patent is extended or adjusted under 35 U.S.C. 154(b) by 253 days.

(21) Appl. No.: 18/473,890

(22) Filed: Sep. 25, 2023

(65) Prior Publication Data

US 2024/0106556 A1    Mar. 28, 2024

Related U.S. Application Data

(60) Provisional application No. 63/409,805, filed on Sep. 25, 2022.

(51) Int. Cl.
*H04Q 11/00*    (2006.01)
*H04J 3/16*    (2006.01)

(52) U.S. Cl.
CPC ........ *H04J 3/1652* (2013.01); *H04Q 11/0062* (2013.01); *H04J 2203/0053* (2013.01); *H04J 2203/0098* (2013.01); *H04Q 2011/0086* (2013.01)

(58) Field of Classification Search
None
See application file for complete search history.

(56) References Cited

U.S. PATENT DOCUMENTS

| | | | | |
|---|---|---|---|---|
| 8,488,622 | B2* | 7/2013 | Sakamoto | H04J 3/076 370/464 |
| 8,705,741 | B2* | 4/2014 | Voruganti | H04K 1/04 380/255 |
| 9,312,980 | B1* | 4/2016 | Kakande | H04J 14/0279 |
| 9,485,050 | B2* | 11/2016 | Barnard | H04Q 11/0066 |
| 10,154,322 | B2* | 12/2018 | Tandi | H04Q 11/0005 |
| 10,693,579 | B2* | 6/2020 | Boura | H04J 3/0691 |
| 11,272,270 | B1* | 3/2022 | Lee | H04L 1/0045 |

(Continued)

*Primary Examiner* — Jai M Lee

(57) ABSTRACT

Disclosed herein are methods and systems for routing traffic. One exemplary system includes a muxponder module deployed in an optical network, the muxponder having an optical receiver, a first and second electrical port, a demultiplexer having a built-in digital cross-connect, and a processor accessing a first calculated carrier frequency to assign traffic streams associated with a first service identification code to a first and second host lane of the first electrical port, and a second calculated carrier frequency to assign traffic streams associated with a second service identification code to a third and fourth host lane of the second electrical port, and having logic to control the digital cross-connect to route a first and a second traffic stream to the first electrical port based on the first service identification code, and a third and a fourth traffic stream to the second electrical port based on the second service identification code.

20 Claims, 8 Drawing Sheets

(56) References Cited

U.S. PATENT DOCUMENTS

| | | | |
|---|---|---|---|
| 2005/0089027 A1* | 4/2005 | Colton | H04Q 11/0005 370/380 |
| 2005/0180749 A1* | 8/2005 | Koley | H04J 14/0294 398/45 |
| 2013/0039644 A1* | 2/2013 | Taniguchi | H04J 14/0227 398/10 |
| 2023/0361903 A1* | 11/2023 | Hand | H04J 3/1652 |

* cited by examiner

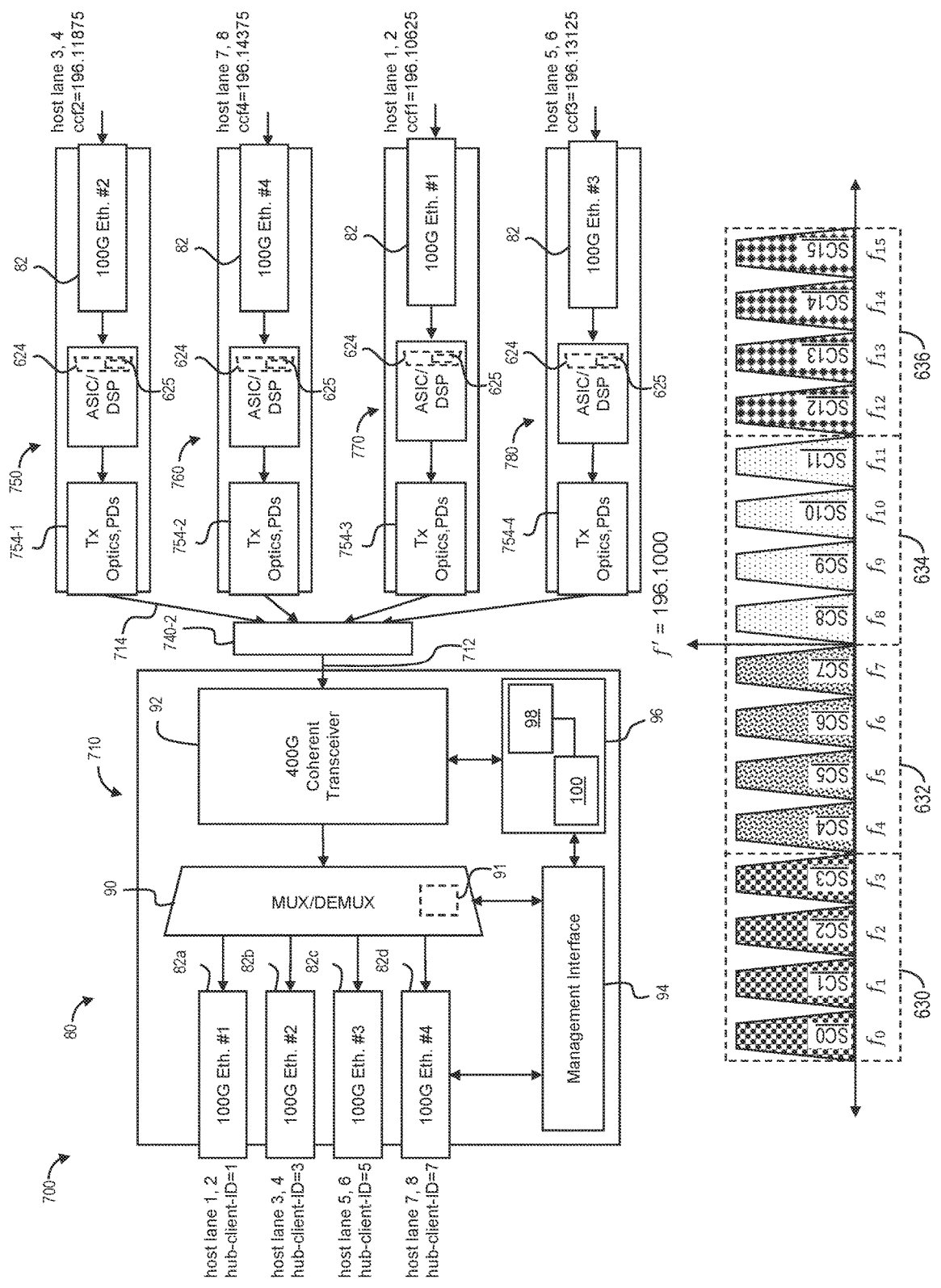

SYSTEMS AND METHODS FOR ENABLING POINT-TO-MULTI-POINT APPLICATIONS IN COMMON MANAGEMENT INTERFACE SPECIFICATION

CROSS-REFERENCE TO RELATED APPLICATION

This application claims priority to U.S. Provisional Patent Application No. 63/409,805, filed Sep. 25, 2022, titled "Enabling Point-To-Multi-Point Applications in CMIS", the content of which is incorporated herein by reference in its entirety.

BACKGROUND

Optical networking is a communication means that utilizes signals encoded in light to transmit information, e.g., data, as an optical signal in various types of telecommunications networks. Optical networking may be used in relatively short-range networking applications such as in a local area network (LAN) or in long-range networking applications, such as those spanning countries, continents, and/or oceans. Generally, optical networks utilize optical amplifiers, a light source such as lasers or light emitting diodes (LEDs), and wavelength division multiplexing to enable high-bandwidth communication.

Muxponders are network modules that aggregate multiple services for optical transmission. Muxponders may be configured to operate following the Common Management Interface Specification (CMIS) version 5.2, published April 2022, which is a standard promulgated by the Optical Internetworking Forum (OIF) that is directed toward management of several different kinds of modules for optical fiber and copper cable interconnects. CMIS provides application instance configuration based on fixed physical media lane configuration.

Under the CMIS standard, there is a pre-defined mapping from host lane to host lane, in order to associate data across modules to route the data to its desired destination. For instance, data originating from host lane 1 on a sending module is automatically mapped to host lane 1 on a receiving module. Under current configurations, this assigned mapping cannot be changed, because for each application where a module, or modules, support multiple application instances, a host needs to be able to determine which host lane or host lane group corresponds to which media lane group for each possible application instance in the module.

However, such "fixed" mapping can be problematic. For example, fixed mapping is limited by the number of physical connections. In a point to multi-point network, for instance, a physical optical port is needed for each host lane group connection. Further, the fixed mapping cannot be changed in response to a problem, such as with the lanes of the receiving module. Additionally, currently, modules cannot be dynamically configured to map data traffic to desired host lanes that are not the matching lane to the sending module lane.

SUMMARY OF THE INVENTION

The presently disclosed inventive concepts solve the problems of fixed mapping by providing systems and methods for configurable lane mapping for muxponder modules for transport networks. In one implementation, the problems of fixed mapping in associated network modules are solved by enabling dynamic host lane mapping, which allows a network operator to dynamically map host lanes in a host lane group on a first network element to a desired host lane group on a second network element as disclosed herein.

In one implementation, an optical transport network system, may comprise: an anchor muxponder module, comprising: a first electrical port having a first host lane receiving a first traffic stream and a second host lane receiving a second traffic stream, the first host lane having a first electrical register, and the second host lane having a second electrical register; a second electrical port having a third host lane receiving a third traffic stream and a fourth host lane receiving a fourth traffic stream, the third host lane having a third electrical register and the fourth host lane having a fourth electrical register; wherein the first electrical register of the first host lane and the second electrical register of the second host lane are associated with a first client identification code, and the third electrical register of the third host lane and the fourth electrical register of the fourth host lane are associated with a second client identification code; and at least one optical transmitter configured to encode and transmit the first traffic stream, the second traffic stream, the third traffic stream, and the fourth traffic stream at a carrier frequency; at least one configured muxponder module comprising: at least one optical receiver configured to receive and decode the first traffic stream, the second traffic stream, the third traffic stream, and the fourth traffic stream transmitted at the carrier frequency; a first configured electrical port having a first configured host lane associated with a first configured electrical register and a second configured host lane associated with a second configured electrical register; a second configured electrical port having a third configured host lane associated with a third configured electrical register and a fourth configured host lane associated with a fourth configured electrical register; a digital cross-connect; a configured memory storing a first calculated carrier frequency assigned to the first configured electrical port and a second calculated carrier frequency assigned to the second configured electrical port; and a configured-module-processor accessing logic to control the digital cross-connect to route the first traffic stream and the second traffic stream to the first configured electrical port based on the first calculated carrier frequency, and the third traffic stream and the fourth traffic stream to the second configured electrical port based on the second calculated carrier frequency; and a fiber optic link connecting the least one optical transmitter of the anchor module to the at least one optical receiver of the configured module, wherein said fiber optic link is configured to transmit the first traffic stream, the second traffic stream, the third traffic stream, and the fourth traffic stream.

The exemplary implementation, wherein the anchor muxponder module further comprises: a third electrical port having a fifth host lane receiving a fifth traffic stream and a sixth host lane receiving a sixth traffic stream, the fifth host lane having a fifth electrical register, and the sixth host lane having a sixth electrical register, wherein the fifth electrical register of the fifth host lane and the sixth electrical register of the sixth host lane are associated with a third client identification code; and a fourth electrical port having a seventh host lane receiving a seventh traffic stream and an eighth host lane receiving an eighth traffic stream, the seventh host lane having a seventh electrical register and the eighth host lane having an eighth electrical register, wherein the seventh electrical register of the seventh host lane and the eighth electrical register of the eighth host lane are associated with a fourth client identification code; and wherein the at least one configured muxponder module further comprises: a third configured electrical port having a fifth configured host lane associated with a fifth configured electrical register and a sixth configured host lane associated with a sixth configured electrical register; a fourth configured electrical port having a seventh configured host lane associated with a seventh configured electrical register and an eighth configured host lane associated with an eighth configured electrical register; wherein the configured memory further stores a third calculated carrier frequency assigned to the third configured electrical port and a fourth calculated carrier frequency assigned to the fourth configured electrical port and the configured-module-processor further accesses logic to control the digital cross-connect to route the fifth traffic stream and the sixth traffic stream to the third configured electrical port based on the third calculated carrier frequency, and the seventh traffic stream and the eighth traffic stream to the fourth configured electrical port based on the fourth calculated carrier frequency.

The exemplary system of claim 1, wherein the at least one optical receiver comprises a first optical receiver and a second optical receiver, and wherein the at least one configured muxponder module comprises: a first configured muxponder module comprising the first optical receiver, a first digital cross-connect, the first electrical port, a first configured memory storing the first calculated carrier frequency, and a first configured-module-processor accessing first logic to control the first digital cross-connect to route the first traffic stream and the second traffic stream to the first configured electrical port based on the first calculated carrier frequency; and a second configured muxponder module comprising the second configured optical receiver, a second digital cross-connect, the second configured electrical port, a second configured memory storing the second calculated carrier frequency, and a second configured-module-processor accessing second logic to control the second digital cross-connect to route the third traffic stream and the fourth traffic stream to the second configured electrical port based on the second calculated carrier frequency.

The exemplary system, wherein the anchor muxponder module further comprises a multiplexer, the multiplexer configured to combine the first traffic stream, the second traffic stream, the third traffic stream, and the fourth traffic stream as a combined digital signal and pass the combined digital signal to the at least one optical transmitter, the at least one optical transmitter configured to convert the combined digital signal to at least one combined optical signal and provide the at least one combined optical signal to the fiber optic link.

The exemplary system, wherein the combined digital signal comprises a first digital subcarrier group and a second digital subcarrier group, the first traffic stream and the second traffic stream encoded into the first digital subcarrier group and the third traffic stream and the fourth traffic stream encoded into the second digital subcarrier group.

The exemplary system, further comprising an optical splitter connected to the fiber optic link, the optical splitter configured to receive the at least one combined optical signal from the at least one optical transmitter and split the at least one combined optical signal to form at least one split optical signal.

The exemplary system, wherein the first configured muxponder module further comprises a first demultiplexer, the second configured muxponder module further comprises a second demultiplexer, and the at least one split optical signal comprises a first split optical signal directed to the first configured muxponder module and a second split optical signal direct to the second configured muxponder module, each of the first split optical signal and the second split optical signal comprising the first digital subcarrier group comprising the first traffic stream and the second traffic stream, and the second digital subcarrier group comprising the third traffic stream and the fourth traffic stream; wherein the first configured muxponder module is configured to receive, at the first optical receiver, the first split optical signal, convert the first split optical signal to a first split digital signal and pass the first split digital signal to the first configured demultiplexer and demultiplex, with the first demultiplexer the first split digital signal into the first digital subcarrier group comprising the first traffic stream and the second traffic stream, and the second digital subcarrier group comprising the third traffic stream and the fourth traffic stream, and route, with the first digital cross connect accessing the first calculated carrier frequency, the first traffic stream and the second traffic stream to the first configured electrical port and discard the third traffic stream and the fourth traffic stream; and wherein the second configured muxponder module is configured to receive, at the second optical receiver, the second split optical signal, convert the second split optical signal to a second split digital signal and pass the second split digital signal to the second configured demultiplexer and demultiplex, with the second demultiplexer the second split optical signal into the first digital subcarrier group comprising the first traffic stream and the second traffic stream, and the second digital subcarrier group comprising the third traffic stream and the fourth traffic stream, and route, with the second digital cross connect accessing the second calculated carrier frequency, the third traffic stream and the fourth traffic stream to the second configured electrical port and discard the first traffic stream and the second traffic stream.

Another exemplary system, comprising: a configured muxponder module, comprising: an optical receiver configured to receive a combined optical signal comprising a first traffic stream, a second traffic stream, a third traffic stream, and a fourth traffic stream transmitted on a carrier frequency, the first traffic stream and the second traffic stream transmitted from a first electrical port having a first client identification code, and the third traffic stream and the fourth traffic stream transmitted from a second electrical register having a second client identification code, the optical receive configured to convert the combined optical signal to a combined digital signal; a first configured electrical port having a first configured host lane associated with a first configured electrical register and a second configured host lane associated with a second configured electrical register; a second configured electrical port having a third configured host lane associated with a third configured electrical register and a fourth configured host lane associated with a fourth configured electrical register; a demultiplexer having a built-in digital cross-connect configured to demultiplex the combined digital signal into the first traffic stream, the second traffic stream, the third traffic stream, and the fourth traffic stream; a configured memory storing a first calculated carrier frequency assigned to the first configured electrical port and a second calculated carrier frequency assigned to the second configured electrical port; and a configured-module-processor accessing logic to control the digital cross-connect to route the first traffic stream and the second traffic stream to the first configured electrical port based on the first calculated carrier frequency, and the third traffic stream and the fourth traffic stream to the second configured electrical port based on the second calculated carrier frequency.

The exemplary system, further comprising an anchor muxponder module, comprising: a first electrical port having a first host lane receiving the first traffic stream and a second host lane receiving the second traffic stream, the first host lane having a first electrical register, and the second host lane having a second electrical register; a second electrical port having a third host lane receiving the third traffic stream and a fourth host lane receiving the fourth traffic stream, the third host lane having a third electrical register and the fourth host lane having a fourth electrical register; wherein the first electrical register of the first host lane and the second electrical register of the second host lane are associated with a first client identification code, and the third electrical register of the third host lane and the fourth electrical register of the fourth host lane are associated with a second client identification code; and at least one optical transmitter configured to transmit the first traffic stream, the second traffic stream, the third traffic stream, and the fourth traffic stream as the combined optical signal.

The exemplary system, wherein the anchor muxponder module further comprises a multiplexer, the multiplexer configured to combine the first traffic stream, the second traffic stream, the third traffic stream, and the fourth traffic into a combined digital signal and pass the combined digital signal to the at least one optical transmitter, the at least one optical transmitter configured to convert the combined digital signal to the combined optical signal and provide the combined optical signal to a fiber optic link.

The exemplary system, further comprising an optical splitter connected to the fiber optic link, the optical splitter configured to receive the combined optical signal from the at least one optical transmitter and split the combined optical signal to form at least one split optical signal.

The exemplary system, wherein the anchor muxponder module further comprises: a third electrical port having a fifth host lane receiving a fifth traffic stream and a sixth host lane receiving a sixth traffic stream, the fifth host lane having a fifth electrical register, and the sixth host lane having a sixth electrical register, wherein the fifth electrical register of the fifth host lane and the sixth electrical register of the sixth host lane are associated with a third client identification code; a fourth electrical port having a seventh host lane receiving a seventh traffic stream and an eighth host lane receiving an eighth traffic stream, the seventh host lane having a seventh electrical register and the eighth host lane having an eighth electrical register, wherein the seventh electrical register of the seventh host lane and the eighth electrical register of the eighth host lane are associated with a fourth client identification code; and wherein the configured muxponder module further comprises: a third configured electrical port having a fifth configured host lane associated with a fifth configured electrical register and a sixth configured host lane associated with a sixth configured electrical register; a fourth configured electrical port having a seventh configured host lane associated with a seventh configured electrical register and an eighth configured host lane associated with an eighth configured electrical register; and wherein the configured memory further stores a third calculated carrier frequency assigned to the third configured electrical port and a fourth calculated carrier frequency assigned to the fourth configured electrical port and the configured-module-processor further accesses logic to control the digital cross-connect to route the fifth traffic stream and the sixth traffic stream to the third configured electrical port based on the third calculated carrier frequency, and the seventh traffic stream and the eighth traffic stream to the fourth configured electrical port based on the fourth calculated carrier frequency.

The exemplary system, wherein the anchor muxponder module further comprises a multiplexer, the multiplexer configured to combine the first traffic stream, the second traffic stream, the third traffic stream, the fourth traffic stream, the fifth traffic stream, the sixth traffic stream, the seventh traffic stream, and the eighth traffic stream into a combined digital signal and pass the combined digital signal to the at least one optical transmitter, the at least one optical transmitter configured to convert the combined digital signal to the combined optical signal and provide the combined optical signal to a fiber optic link.

The exemplary system, wherein the combined digital signal comprises a first digital subcarrier group, a second digital subcarrier group, a third digital subcarrier group, and a fourth digital subcarrier group, the first traffic stream and the second traffic stream encoded into the first digital subcarrier group, the third traffic stream and the fourth traffic stream encoded into the second digital subcarrier group, the fifth traffic stream and the sixth traffic stream encoded into the third digital subcarrier group, and the seventh traffic stream and the eighth traffic stream encoded into the fourth digital subcarrier group.

The exemplary system, further comprising an optical splitter connected to the fiber optic link, the optical splitter configured to receive the combined optical signal from the at least one optical transmitter and split the combined optical signal to form at least one split optical signal.

The exemplary system, wherein the configured muxponder module is a first configured muxponder module and the system further comprises a second configured muxponder module, and wherein the at least one split optical signal comprises a first split optical signal directed to the first configured muxponder module and a second split optical signal directed to the second configured muxponder module.

Another exemplary optical transport network system, comprising: an anchor muxponder module, comprising: a first electrical port having a first host lane receiving a first traffic stream and a second host lane receiving a second traffic stream, the first host lane having a first electrical register, and the second host lane having a second electrical register; a second electrical port having a third host lane receiving a third traffic stream and a fourth host lane receiving a fourth traffic stream, the third host lane having a third electrical register and the fourth host lane having a fourth electrical register; wherein the first electrical register of the first host lane and the second electrical register of the second host lane are associated with a first client identification code, and the third electrical register of the third host lane and the fourth electrical register of the fourth host lane are associated with a second client identification code; an anchor module digital cross-connect; an anchor module processor configured to cause the anchor module digital cross-connect to encode the first traffic stream and the second traffic stream into digital subcarriers of a first digital subcarrier group based on the first client identification code and an assigned carrier frequency and encode the third traffic stream and the fourth traffic stream into digital subcarriers of a second digital subcarrier group based on the second client identification code and the assigned carrier frequency into a digital signal; and at least one optical transmitter configured to encode the digital signal containing the first digital subcarrier group and the second digital subcarrier group into an optical signal and transmit the optical signal at the assigned carrier frequency; at least one configured muxponder module comprising: a first configured electrical port having a first configured host lane associated with a first configured electrical register and a second configured host lane associated with a second configured electrical register;

a second configured electrical port having a third configured host lane associated with a third configured electrical register and a fourth configured host lane associated with a fourth configured electrical register; at least one optical receiver configured to receive the optical signal transmitted at the assigned carrier frequency and decode the optical signal into a second digital signal; a configured muxponder digital cross-connect; a configured-module-processor accessing logic to control the configured muxponder digital cross-connect to decode the second digital signal into the first digital subcarrier group containing the first traffic stream and the second traffic stream and the second digital subcarrier group containing the third traffic stream and the fourth traffic stream and route the first traffic stream and the second traffic stream to the first configured electrical port based on the first client identification code and the assigned carrier frequency, and the third traffic stream and the fourth traffic stream to the second configured electrical port based on the second client identification code and the assigned carrier frequency; and a fiber optic link connecting the least one optical transmitter of the anchor module to the at least one optical receiver of the configured module, wherein said fiber optic link is configured to transmit the optical signal.

The exemplary optical transport network system, wherein the assigned carrier frequency is a center frequency of the first digital subcarrier group and the second digital subcarrier group.

The exemplary optical transport network system, wherein the digital subcarriers of the first subcarrier group are transmitted at a frequency below the assigned carrier frequency and the digital subcarriers of the second subcarrier group are transmitted at a frequency above the assigned carrier frequency.

The exemplary optical transport network system, wherein first digital subcarrier group comprises four digital subcarriers and the second digital subcarrier group comprises four digital subcarriers.

Implementations of the above techniques include methods, apparatus, systems, networks, and computer program products. One such computer program product is suitably embodied in a non-transitory machine-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features, and advantages will become apparent from the description, the drawings, and the claims.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings:

FIGS. 7A and 7B illustrate an exemplary point to multipoint transport network having an anchor module and multiple configured modules, each with an associated calculated carrier frequency that is used to assign traffic streams to host lanes constructed in accordance with the present disclosure;

DETAILED DESCRIPTION

Figure 1:
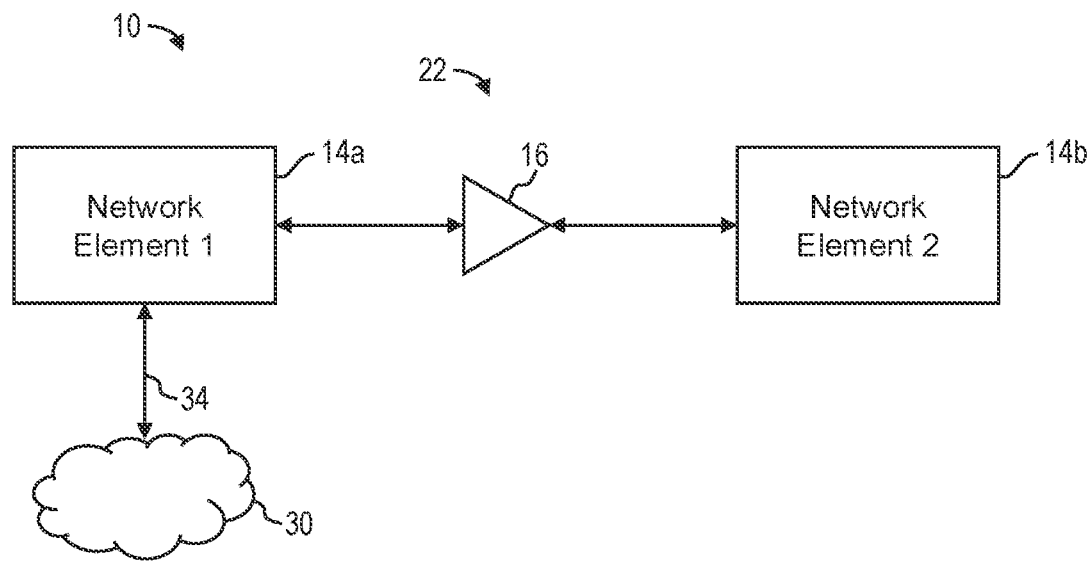
FIG. 1 is a block diagram of an exemplary implementation of a transport network constructed in accordance with the present disclosure.

The following detailed description of exemplary embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein are for purposes of description and should not be regarded as limiting.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise. Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one implementation," "some implementations," "an implementation," "one example," "for example," or "an example" means that a particular element, feature, structure, or characteristic described in connection with the embodiment/implementation/example is included in at least one embodiment/implementation/example and may be used in conjunction with other embodiments/implementations/examples. The appearance of the phrase "in some embodiments" or "one example" or "in some implementations" in various places in the specification does not necessarily all refer to the same embodiment/implementation/example, for example.

Circuitry, as used herein, may be analog and/or digital components referred to herein as "blocks", or one or more suitably programmed processors (e.g., microprocessors) and associated hardware and software, or hardwired logic. Also, "components" or "blocks" may perform one or more functions. The term "component" or "block" may include hardware, such as a processor (e.g., a microprocessor), a combination of hardware and software, and/or the like. Software may include one or more processor-executable instructions that when executed by one or more components cause the component to perform a specified function. It should be understood that the algorithms described herein may be stored on one or more non-transitory memory. Exemplary non-transitory memory may include random access memory, read-only memory, flash memory, and/or the like. Such non-transitory memory may be electrically based, optically based, and/or the like.

Software may include one or more processor-readable instruction that when executed by one or more component, e.g., a processor, causes the component to perform a specified function. It should be understood that the algorithms described herein may be stored on one or more non-transitory processor-readable medium, which is also referred to herein as a non-transitory memory. Exemplary non-transitory processor-readable mediums may include random-access memory (RAM), a read-only memory (ROM), a flash memory, and/or a non-volatile memory such as, for example, a CD-ROM, a hard drive, a solid-state drive, a flash drive, a memory card, a DVD-ROM, a Blu-ray Disk, a disk, and an optical drive, combinations thereof, and/or the like. Such non-transitory processor-readable media may be electrically based, optically based, magnetically based, and/or the like.

Further, the messages described herein may be generated by the components and result in various physical transformations.

As used herein, the terms "network—based," "cloud-based," and any variations thereof, are intended to include the provision of configurable computational resources on demand via interfacing with a computer and/or computer network, with software and/or data at least partially located on a computer and/or computer network.

The generation of laser beams for use as optical data channel signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

As used herein, an optical link may be one or more optical fiber and associated hardware, such as one or more optical repeater, carrying one or more of an optical channel, an optical super-channel (e.g., multiple optical channels that are routed together), a super-channel group, an optical carrier group, a set of spectral slices, an optical control channel (e.g., sometimes referred to herein as an optical supervisory channel, or an "OSC"), and an optical data channel (e.g., sometimes referred to herein as "BAND").

As used herein, an "optical communication path" and/or an "optical route" may correspond to an optical path and/or an optical light path. For example, an optical communication path may specify a path along which light is carried between two or more network entities along an optical link, e.g., an optical fiber.

As used herein, a transmission line segment (which may be referred to as an optical link or an optical multiplex section) is the portion of a transmission line from a first node (e.g., a first muxponder) transmitting a transmission signal to a second node (e.g., a second muxponder) receiving the transmission signal. The transmission line segment may include one or more optical in-line amplifier situated between the first node and the second node. In some implementations, an optical multiplex section (OMS) has the same scope as the transmission line segment (TLS). In some implementations, the OMS may be a subset of a TLS.

As used herein, optical control channel refers to a channel (e.g., a dedicated wavelength) in an optical network that is accessed at each network element or node and is used for monitoring and managing the optical network. Functions performed using the optical control channel include, but are not limited to, performance monitoring (e.g., signal power, bit error rate (BER), and other parameters), network management (e.g., monitor and configure network elements, fault detection, and conduct maintenance activities such as remote software upgrades and network management information), and protection and restoration. The optical control channel is not used to carry payload traffic (i.e., client signals).

Referring now to the drawings, and in particular to FIG. 1, shown therein is a diagram of an exemplary implementation of a transport network 10 constructed in accordance with the present disclosure. The transport network 10 is depicted as having a plurality of network elements 14a-n, including a first network element 14a and a second network element 14b. Though two network elements 14 are shown for the purposes of illustration, it will be understood that the plurality of network elements 14a-n may comprise more or fewer network elements 14. Data transmitted within the transport network 10 may be transmitted along optical paths formed by a transmission line segment 22 (which may also be referred to as "media lane 22"). The transport network 10 may be provided with one or more optical in-line amplifiers (ILA) disposed in the transmission line segment 22 such as ILA 16. Though a single transmission line segment 22 is shown, it will be understood that the transport network 10 may comprise additional transmission line segments 22, such as between additional network elements 14.

In one implementation, a user may interact with a computer system 30, e.g., via a user device, that may be used to communicate with one or more of the network elements 14a-n (hereinafter "network element 14") via a communication channel 34. Each element of the computer system 30 may be partially or completely network-based or cloud-based, and may or may not be located in a single physical location.

In some implementations, the computer system 30 is connected to one or more network element 14 via the communication channel 34. In this way, the computer system 30 may communicate with each of the one or more network element 14, and may, via the communication channel 34 transmit or receive data from each of the one or more network element 14. In other embodiments, the computer system 30 may be integrated into each network element 14 and/or may communicate with one or more pluggable card within the network element 14. In some embodiments, the computer system 30 may be a remote network element.

The communication channel 34 may permit bi-directional communication of information and/or data between the computer system 30 and/or the network elements 14 of the transport network 10. The communication channel 34 may interface with the computer system 30 and/or the network elements 14 in a variety of ways. For example, in some embodiments, the communication channel 34 may interface by optical and/or electronic interfaces, and/or may use a plurality of network topographies and/or protocols including, but not limited to, Ethernet, TCP/IP, circuit switched path, combinations thereof, and/or the like. The communication channel 34 may utilize a variety of network protocols to permit bi-directional interface and/or communication of data and/or information between the computer system 30 and/or the network elements 14.

The communication channel 34 may be a network connection. For example, in some embodiments, the communication channel 34 may be a version of an Internet network (e.g., exist in a TCP/IP-based network). In one embodiment, the communication channel 34 is the Internet. It should be noted, however, that the communication channel 34 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like.

If the communication channel 34 is the Internet, a primary user interface of the computer system 30 may be delivered through a series of web pages or private internal web pages of a company or corporation, which may be written in hypertext markup language, JavaScript, or the like, and accessible by the user. It should be noted that the primary user interface of the computer system 30 may be another type of interface including, but not limited to, a Windows-based application, a tablet-based application, a mobile web interface, a VR-based application, an application running on a mobile device, and/or the like. In one embodiment, the communication channel 34 may be connected to one or more of the user devices, computer system 30, and the network elements 14a-n.

The transport network 10 may be, for example, made up of interconnected individual nodes (that is, the network elements 14). The transport network 10 may include any type of network that uses light as a transmission medium. For example, the transport network 10 may include a fiber-optic based network, an optical transport network, a light-emitting diode network, a laser diode network, an infrared network, a wireless optical network, a wireless network, combinations thereof, and/or other types of optical networks.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the transport network 10 may perform one or more functions described as being performed by another one or more of the devices of the transport network 10. Devices of the computer system 30 may interconnect via wired connections, wireless connections, or a combination thereof. For example, in one embodiment, the user device and the computer system 30 may be integrated into the same device, that is, the user device may perform functions and/or processes described as being performed by the computer system 30, described below in more detail.

Figure 2:
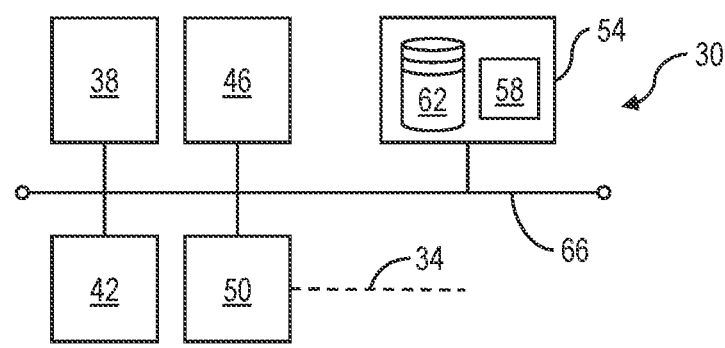
FIG. 2 is a diagram of an exemplary implementation of a computer system shown in FIG. 1 and constructed in accordance with the present disclosure.

Referring now to FIG. 2, shown therein is a diagram of an exemplary embodiment of the computer system 30 constructed in accordance with the present disclosure. In some embodiments, the computer system 30 may include, but is not limited to, implementations as a pluggable computer housed in a network chassis, a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the computer system 30 may include one or more input devices 38 (hereinafter "input device 38"), one or more output devices 42 (hereinafter "output device 42"), one or more processors 46 (hereinafter "processor 46"), one or more communication devices 50 (hereinafter "communication device 50") capable of interfacing with the communication channel 34, one or more non-transitory processor-readable medium (hereinafter "computer system memory 54") storing processor-executable code and/or software application(s) 58, for example including, a web browser capable of accessing a website and/or communicating information and/or data over a wireless or wired network (e.g., the communication channel 34), and/or the like, and a database 62. The input device 38, the output device 42, the processor 46, the communication device 50, and the computer system memory 54 may be connected via a path 66 such as a data bus that permits communication among the components of the computer system 30.

In some implementations, the processor 46 may comprise one or more processor 46 working together, or independently, to read and/or execute processor executable code and/or data, such as stored in the computer system memory 54. The processor 46 may be capable of creating, manipulating, retrieving, altering, and/or storing data structures into the computer system memory 54. Each element of the computer system 30 may be partially or completely network-based or cloud-based, and may or may not be located in a single physical location.

Exemplary implementations of the processor 46 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 46 may be capable of communicating with the computer system memory 54 via the path 66 (e.g., data bus). The processor 46 may be capable of communicating with the input device 38 and/or the output device 42.

The processor 46 may be further capable of interfacing and/or communicating with the network elements 14 via the communication channel 34 using the communication device 50. For example, the processor 46 may be capable of communicating via the communication channel 34 by exchanging signals (e.g., analog, digital, optical, and/or the like) via one or more ports (e.g., physical or virtual ports) using a network protocol to provide information to the one or more network element 14.

The computer system memory 54 may store a software application 58 that, when executed by the processor 46, causes the computer system 30 to perform an action such as communicate with, or control, one or more component of the computer system 30, the transport network 10 (e.g., the one or more network element 14a-n), and/or the communication channel 34.

In some implementations, the computer system memory 54 may have a data store that may store data such as network element version information, firmware version information, sensor data, system data, metrics, logs, tracing, and the like in a raw format as well as transformed data that may be used for tasks such as reporting, visualization, analytics, signal routing, power loading operations and/or coordination, etc. The data store may include structured data from relational databases, semi-structured data, unstructured data, time-series data, and binary data. The data store may be a database, a remote accessible storage, or a distributed filesystem. In some embodiments, the data store may be a component of an enterprise network.

In some implementations, the computer system memory 54 may be located in the same physical location as the computer system 30, and/or one or more computer system memory 54 may be located remotely from the computer system 30. For example, the computer system memory 54 may be located remotely from the computer system 30 and communicate with the processor 46 via the communication channel 34. Additionally, when more than one computer system memory 54 is used, a first computer system memory may be located in the same physical location as the processor 46, and additional computer system memory may be located in a location physically remote from the processor 46. Additionally, the computer system memory 54 may be implemented as a "cloud" non-transitory processor-readable storage memory (i.e., one or more of the computer system memories 54 may be partially or completely based on or accessed using the communication channel 34).

In one implementation, the database 62 may be a time-series database, a relational database or a non-relational database. Examples of such databases comprise, DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The database 62 can be centralized or distributed across multiple systems.

The input device 38 may be capable of receiving information input from the user, another computer, and/or the processor 46, and transmitting such information to other components of the computer system 30 and/or the communication channel 34. The input device 38 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 42 may be capable of outputting information in a form perceivable by the user, another computer system, and/or the processor 46. For example, implementations of the output device 42 may include, but are not limited to, a computer monitor, a screen, a touchscreen, a speaker, a website, a television set, a smart phone, a PDA, a cell phone, a fax machine, a printer, a laptop computer, a haptic feedback generator, a network interface, combinations thereof, and the like, for example. It is to be understood that in some exemplary embodiments, the input device 38 and the output device 42 may be implemented as a single device, such as, for example, a touchscreen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

In general, the network element 14 transmits and receives data traffic and control signals. Nonexclusive examples of implementations of the network element 14 include a muxponder, optical line terminals (OLTs), optical cross connects (OXCs), optical line amplifiers, optical add/drop multiplexer (OADMs) and/or reconfigurable optical add/drop multiplexers (ROADMs), interconnected by way of optical fiber links.

Figure 3:
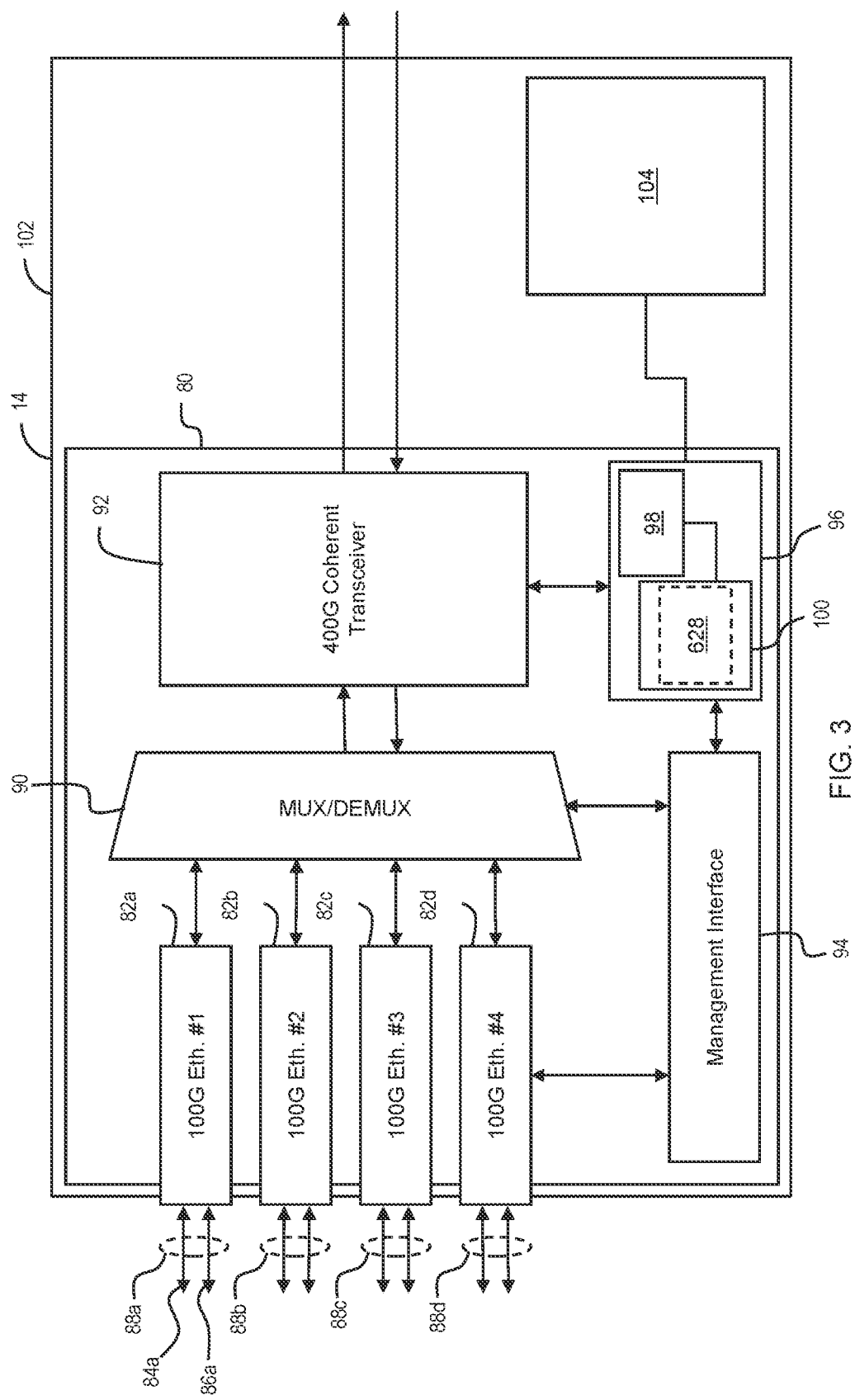
FIG. 3 is a block diagram of an exemplary implementation of a network element being a muxponder constructed in accordance with the present disclosure.

Referring now to FIG. 3, shown therein is a block diagram of an exemplary implementation of the network element 14 constructed in accordance with the present disclosure. In the implementation illustrated in FIG. 3, the network element 14 may be, or may be provided with, a muxponder 80. The muxponder 80 may be configured to aggregate multiple electrical network services, such as Ethernet, SONET/SDH, Fibre Channel, HD/SD-SDI, OTU2/3/4, etc., into an optical signal or signals. The muxponder 80 may be provided with a plurality of electrical ports 82a-n (illustrated for exemplary purposes as a first electrical port 82a, a second electrical port 82b, a third electrical port 82c, and a fourth electrical port 82d), each of the electrical ports 82a-82n having an associated first electrical register 84a-n (which may also be referred to as a first host lane or host lane 1, only one of which is labeled in FIG. 3 for clarity) and a second electrical register 86a-n (which may be referred to as a second host lane or host lane 2, only one of which is labeled in FIG. 3 for clarity), the associated first electrical register 84a-n and second electrical register 86a-n as a pair may be referred to as a host lane group and are assigned a hub identification code 88a-88n (referred to herein as hub-client-ID 88a-88n). It should be noted, however, that other terms besides "hub identification" and/or "hub-client-ID" may be used to identify host lanes and/or host lane groups. For instance, in some implementations, "cross-connect identification" and/or "cross-connect ID" may be used. In some implementations, "service identification" and/or "service ID" may be used on one side of a transmission line segment and "cross-connect identification" and/or "cross-connect ID" may be used on the other side of the transmission line segment.

In some implementations, the muxponder 80 may further comprise a multiplexer/demultiplexer 90, an optical transceiver 92, a management interface 94, and/or a controller 96. The controller 96 may be provided with a mux processor 98 and non-transitory computer readable memory 100 (hereinafter "mux memory 100").

The processor 98 executing an application stored in mux memory 100 may become a special-purpose machine particularly suited for performing various actions, operations, analyses, and/or the like in accordance with the systems and methods described herein and illustrated in the FIGS. 3, 6, 7, and 8.

In the illustrated implementation, the electrical ports 82a-82n are shown each having a 100-gigabit capacity. In such an implementation, each of the first electrical register 84a-n and the second electrical register 86a-n would have a 50-gigabit capacity. An exemplary implementation of the electrical ports 82a-82n includes, but is not limited to implementation as a 100GAUI-2 electrical interface that may be part of a pluggable 400 g module.

The muxponder 80 may be hardwired and/or programmed to receive electrical data signals via the electrical ports 82a-82n (which may be referred to as a "host side"), aggregate or multiplex the data signals in the multiplexer/demultiplexer 90, and transmit an optical signal containing the aggregated data via the optical transceiver 92 over the transmission line segment 22 (which may be referred to as a "media side"). The optical transceiver 92 may be provided with a local oscillator laser, optical hybrids, and photodiodes that operate in a known manner to provide electrical signals to an ADC (which may be included in an ASIC), which, in turn, provides digital signals or samples to a DSP. A transmission side of the optical transceiver 92 may be provided with modulators, modulator driver circuitry, and lasers. The DSP may include DAC circuits that convert digital signals from the DSP into analog signals, which are supplied to the modulator driver circuitry.

In some implementations, the network element 14 may be a chassis system 102 and the muxponder 80 maybe a line card inserted in or part of the chassis system 102. The chassis system 102 may be provided with a controller 104 which may be comprised of similar elements as computer system 30.

In FIG. 3, the muxponder 80 is illustrated as a 400-gigabit module having four 100 gigabit electrical ports 82a-82d. However, is should be noted that in other implementations, the muxponder 80 may be provided having any capacity. For instance, the muxponder 80 may be an 800-gigabit module having eight electrical ports 82 with each electrical port 82 having a 100-gigabit capacity. In another exemplary implementation, the muxponder 80 may be an 800-gigabit module having five electrical ports 82 with four of the electrical ports having a 100-gigabit capacity and one of the electrical ports having a 400-gigabit capacity.

Figure 4:
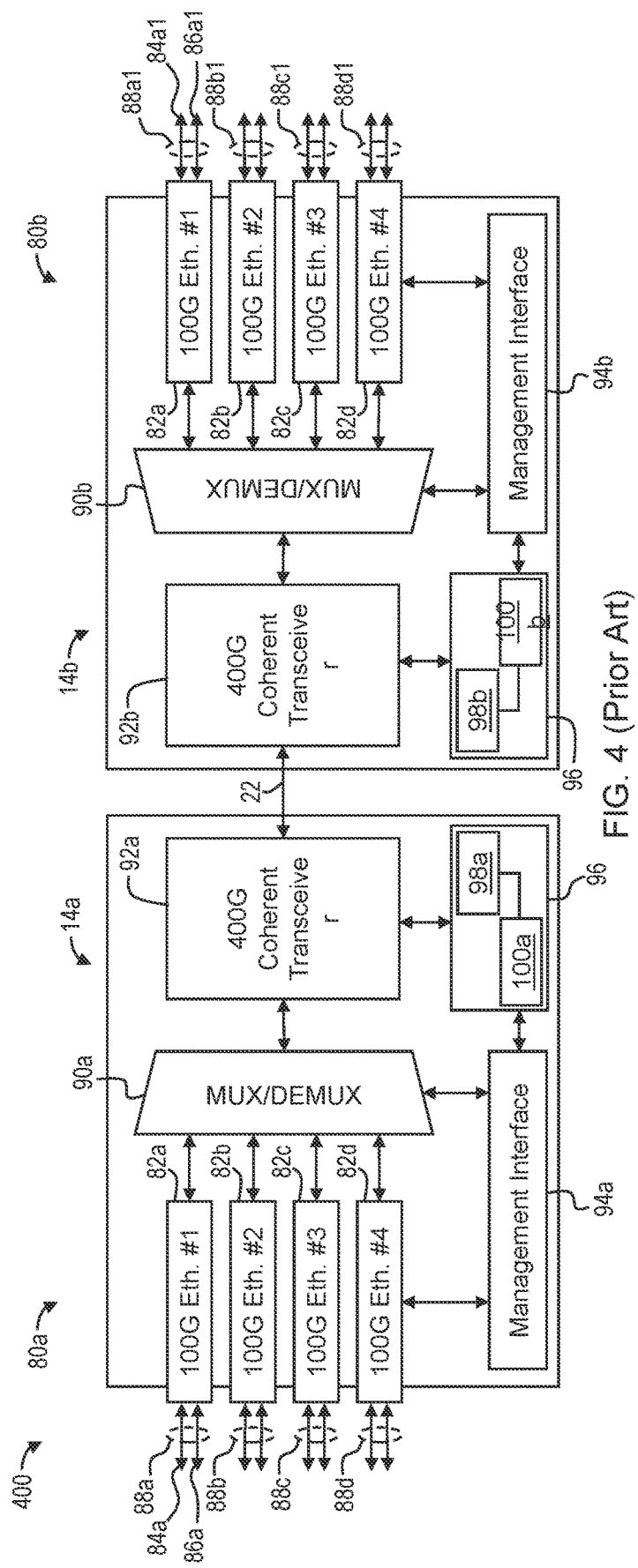
FIG. 4 is a block diagram of an exemplary prior art transport network.

Referring now to FIG. 4, shown therein is a prior art transport network 200 implemented according to methods presently used in the art. One exemplary prior art method uses the Common Management Interface Specification (CMIS) which is a standard directed toward management of several different kinds of modules for optical fiber and copper cable interconnects. CMIS provides application-instance configuration based on fixed physical media lane configuration. In FIG. 4, the transport network 200 is implemented using coherent technology that aggregates all incoming data signals and transmits them via one tunable laser over a single fiber. For the purposes of illustration, network element 14a will be referred to as a sending module and network element 14b will be referred to as a receiving module.

The CMIS standard requires a pre-defined host lane (client interface) to host lane (client interface) mapping. For instance, data originating from host lane 1 (electrical register 84a) and host lane 2 (electrical register 86a) together comprising a host lane group (which may be referred to as a client interface) and identified by a first hub-client-Id 88a on the sending network element 14a are automatically mapped to host lane 1 (electrical register 84a1) and host lane 2 (electrical register 86a1) together comprising a first receiving-client-ID 88a1 on the receiving network element 14b. Likewise, data originating from a second hub-client-Id 88b is mapped to a second receiving-client-ID 88b1, data originating from a third hub-client-Id 88c is mapped to a third receiving-client-ID 88c1, and data originating from a fourth hub-client-Id 88d is mapped to a fourth receiving-client-ID 88d1. This assigned mapping cannot be changed. For each application where a module or modules support multiple application instances (such as first and second network elements 14a and 14b, for example), a host uses this fixed mapping to be able to determine which host lane or host lane group corresponds to which media lane group for each possible application instance in the module.

Figure 5:
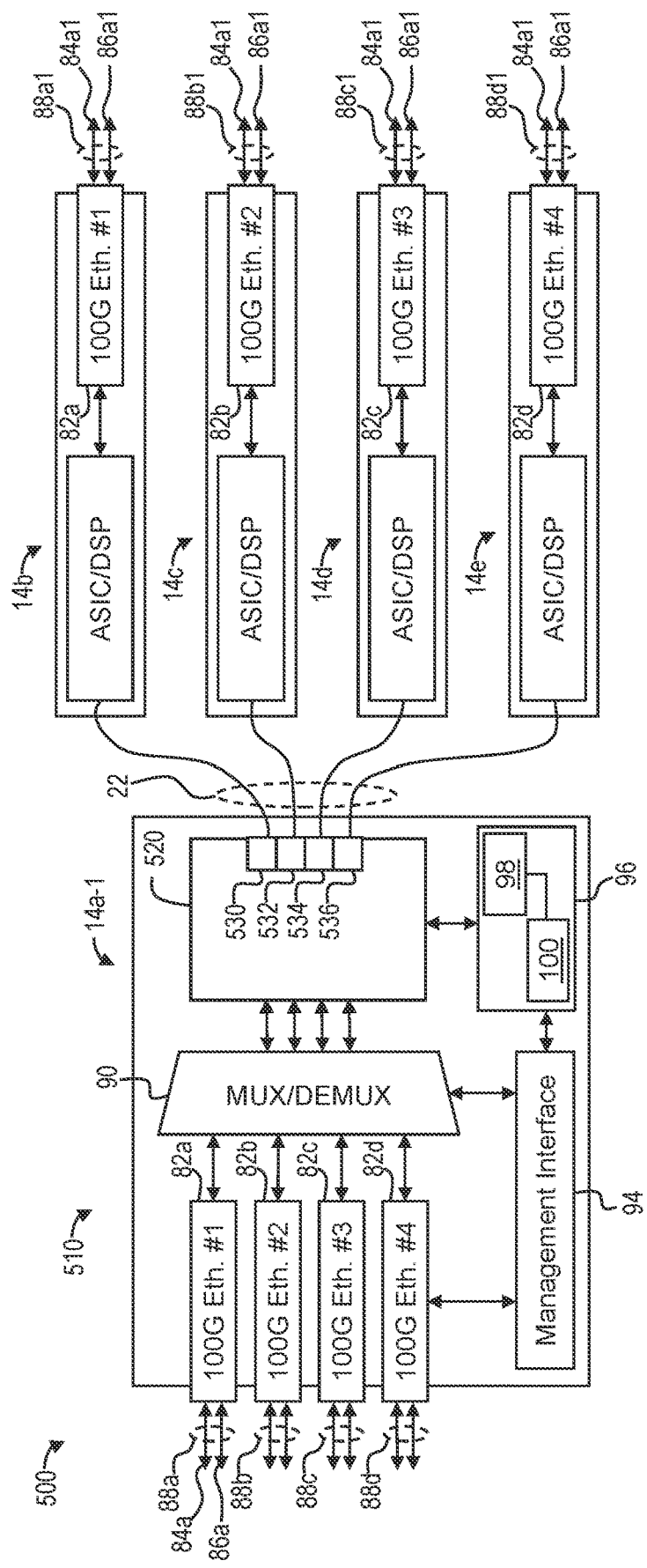
FIG. 5 is a block diagram of another exemplary prior art transport network.

FIG. 5 illustrates an implementation of a transport network 500 implementing CMIS on a multi-point capable network element 14a-1. The multi-point capable network element 14a-1 may be or may have a multi-point capable muxponder 510. The multi-point capable muxponder 510 is similar to the muxponder 80, therefore, only the differences will be described in detail herein. In the multi-point capable muxponder 510, each electrical port, such as the first through fourth electrical ports 82a-82d is mapped to a different corresponding laser (e.g., a first laser 530, a second laser 532, a third laser 534, and a fourth laser 536) that outputs a signal onto a pair of fiber cables, A pair of fiber cables may be referred to as a media lane and may be assigned a register number. For example, the illustrated transport network 500 has four media lanes which may be assigned register numbers, such as media lane 1, media lane 2, media lane 3, and media lane 4. The fiber pairs can be physically routed to corresponding different routers or hosts, such as a second network element 14b, a third network element 14c, a fourth network element 14d, and a fifth network element 14e. The second network element 14b, third network element 14c, fourth network element 14d, and fifth network element 14e, are simplified in FIG. 5 for ease of illustration, but may be similar in construction and/or function to the muxponder 80.

For instance, data originating from host lane 1 (the first electrical register 84a) and host lane 2 (the second electrical register 84b) together comprising the first hub-client-Id 88a on the sending network element 14a are mapped to the first laser 530 transmitting over media lane 1 to the second network element 14b. Likewise, data originating from the second hub-client-Id 88b is mapped to the second laser 532 transmitting over media lane 2 to the third network element 14c, data originating from the third hub-client-Id 88c is mapped to the third laser 534 transmitting over media lane 3 to the fourth network element 14d, and data originating from the fourth hub-client-Id 88*d* is mapped to the fourth laser 536 transmitting over media lane 4 to the fifth network element 14*e*. While the multi-point capable muxponder 500 has the capability to route signals to physically different routers or hosts using the mapped lasers 530-536 and media lanes 1-4, the mapping is fixed and cannot be changed.

Figure 6A:
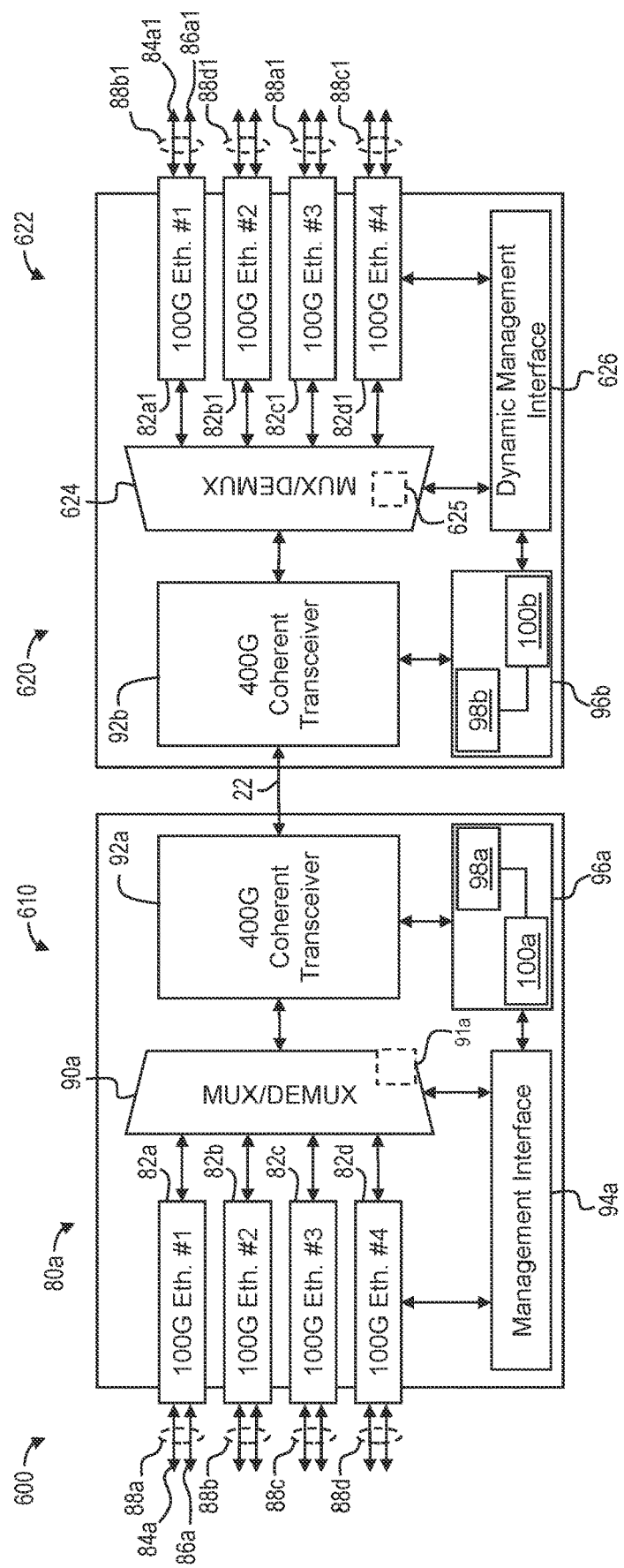
FIG. 6A is a diagram of an exemplary implementation of a transport network having an anchor module and a configured module having calculated carrier frequencies that are used to assign traffic streams to host lanes constructed in accordance with the present disclosure.
Figure 6B:
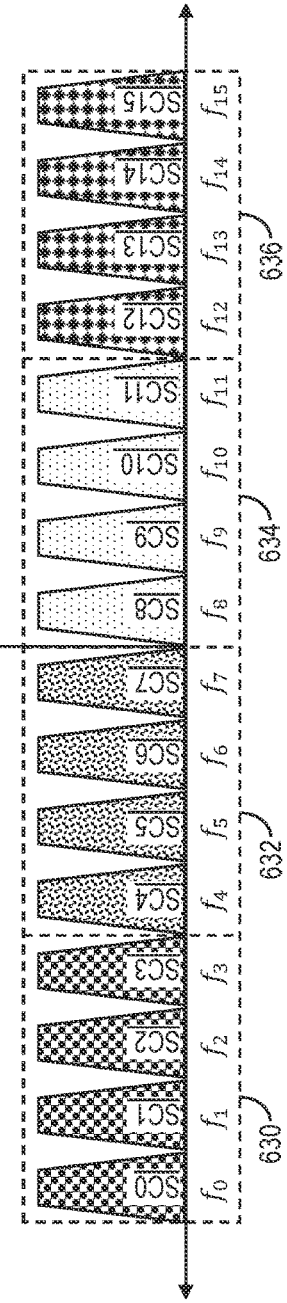
FIG. 6B is a diagram of an exemplary implementation of an optical signal having multiple digital subcarriers grouped into digital subcarrier groups consistent with an aspect of the present disclosure.

Referring now to FIGS. 6A and 6B, shown therein is a transport network 600 is provided with a first network element 610 connected to a second network element 620 via transmission line segment 22. For the purposes of illustration and clarity, the first network element 610 will be referred to as an anchor module 610 and/or as an anchor muxponder module 610, and the second network element 620 will be referred to as a configured module 620 and/or as a configured muxponder module 620. The transport network 600 represents an implementation of a network carrying a point-to-point application.

The anchor module 610 and the configured module 620 are similar to the network element 14 described above. Therefore, for the sake of brevity, like elements will be numbered the same and only the differences will be described in further detail. For purposes of illustration, in FIG. 6, the processor 98 and the mux memory 100 in the anchor module 610 and the configured module 620 are labeled as an anchor-module-processor 98*a*, configured-module-processor 98*b*, anchor-module-mux-memory 100*a*, and configured-module-mux-memory 100*b*.

In the illustrated implementation, the anchor module 610 is provided with a muxponder 80*a* that is hardwired and/or programed to operate using the CMIS standard described above. For instance, host lanes 1 and 2 are a first host lane group which may support a first application instance and are mapped to the first hub-client-Id 88*a* (assigned client interface equal to 1), host lanes 3 and 4 are a second host lane group which may support a second application instance and are mapped to the second hub-client-Id 88*b* (assigned client interface equal to 3), host lanes 5 and 6 are a third host lane group which may support a third application instance and are mapped to the third hub-client-Id 88*c* (assigned client interface equal to 5), and host lanes 7 and 8 are a fourth host lane group which may support a fourth application instance and are mapped to the fourth hub-client-Id 88*d* (assigned client interface equal to 7). The host lanes 1-8 may be lanes, for instance, that are driven by IEEE, Optical Transport Network (OTN), and/or Optical Interface Forum (OIF) standards. The anchor module 610 utilizes the hub-client-Ids, such as the first through fourth hub-client-Ids 88*a*-88*d*, on outbound traffic streams to allow the outbound traffic stream to be directed to a receiving module such as the configured module 620.

In the illustrated implementation, the configured module 620 may be provided with a muxponder 622 having a multiplexer/demultiplexer 624 with built-in digital cross-connect 625 capability and a dynamic management interface 626 electrically connected to the controller 96*b* and the multiplexer/demultiplexer 624.

Shown in FIG. 6B is a diagrammatic example of an exemplary implementation of a plurality of digital subcarriers SC0 to SC15 that may be output by the optical transceiver 92*a* of the anchor module 610 and the optical transceiver 92*b* of the configured module 620. While the plurality of digital subcarriers SC0 to SC15 are depicted as comprising sixteen digital subcarriers, any number of digital subcarriers may be output by the optical transceivers 92*a* and 92*b*. Each of digital subcarriers SC0 to SC15 may have a corresponding one of a plurality of frequencies $f0$ to $f15$. In addition, each of digital subcarriers SC0-SC15 may be a Nyquist subcarrier. A Nyquist subcarrier is a bandwidth of optical signals carrying data, wherein (i) the spectrum of each such optical signal within the group is sufficiently non-overlapping such that the optical signals remain distinguishable from each other in the frequency domain, and (ii) such group of optical signals is generated by modulation of light from a single laser. In general, each digital subcarrier SC may have an optical spectral bandwidth that is at least equal to the Nyquist frequency, as determined by a baud rate of such digital subcarrier SC.

In certain implementations, digital subcarriers SC0-SC15 may be grouped into digital subcarrier groups such as a first digital subcarrier group 630 (comprising digital subcarriers SC0-SC3), a second digital subcarrier group 632 (comprising digital subcarriers SC4-SC7), a third digital subcarrier group 634 (comprising digital subcarriers SC8-SC11), and a fourth digital subcarrier group 636 (comprising digital subcarriers SC12-SC15). Each of the digital subcarrier groups may be associated with a hub-client-Id of the anchor module 610. For instance, the first digital subcarrier group 630 may be associated with the first hub-client-Id 88*a*, the second digital subcarrier group 632 may be associated with the second hub-client-Id 88*b*, the third digital subcarrier group 634 may be associated with the third hub-client-Id 88*c*, and the fourth digital subcarrier group 636 may be associated with the fourth hub-client-Id 88*d*.

Digital subcarriers SC0 to SC15 are generated by modulating light output from a laser. The frequency of such laser output light is a carrier frequency f' and is typically a center frequency such that half of the digital subcarrier frequencies (e.g., $f8$ to $f15$), are above carrier frequency f' and half of the digital subcarrier frequencies (e.g., $f0$ to $f7$) are below carrier frequency f'. In one exemplary implementation, the carrier frequency f' may be 196.1000.

To set the carrier frequency f', when the configured module is connected to the transmission line segment 22, the muxponder 80*a* of the anchor module 610 and the muxponder 622 of the configured module 620 communicate over the optical control channel to set the same carrier frequency f' at both the anchor module 610 and the configured module 620 enabling end-to-end (E2E) transport services.

As further part of a configuration process, when the configured module 620 is connected to the anchor module 610, the anchor module 610 may be programmed to transmit hub-client-IDs 88*a*-88*d* (e.g., 1, 3, 5, 7) for each of the electrical ports 82*a*-82*d* over the optical control channel to be stored in the configured-mux-memory 100*b* and the configured module 620 may be programmed to transmit hub-client-IDs 88*a*1-88*d*1 (e.g., 1, 3, 5, 7) for each of the electrical ports 88*a*1-88*d*1 over the optical control channel to be stored in the mux memory 100*a*. The anchor module 610 may be provided with a digital cross-connect 91*a* as part of the multiplexer/demultiplexer 90*a* which may be programmed to encode and decode digital subcarriers and digital subcarrier groups containing the data of the traffic streams.

The configured-module-processor 98*b* of the configured module 620 may be configured to map or assign digital subcarrier groups of traffic streams to/from the configured module 620 host lanes (such as the first through fourth electrical registers 84*a*1-84*d*1 and 86*a*1-86*d*1) of the electrical ports 82*a*1-82*d*1 to/from the anchor module 610 host lanes (such as the first through fourth electrical registers 84*a*-84*d* and 86*a*-86*d*) of the electrical ports 82*a*-82*d* based on the carrier frequency f' received from the anchor module 610 during the configuration process. A controller 96*b* of the configured module 620 may be provided with logic stored in the configured-mux-memory 100b that, when executed, is configured to cause the configured-module-processor 98b to send a signal or signals to the multiplexer/demultiplexer 624 causing the digital cross-connect 625 of the multiplexer/demultiplexer 624 to dynamically route digital subcarrier groups of incoming and outgoing traffic streams according to the carrier frequency f'.

For instance, in the illustrated implementation, to route traffic streams encoded into the first subcarrier group 630, the second subcarrier group 632, the third subcarrier group 634, and the fourth subcarrier group 636 between the anchor module 610 and the configured module 620, the logic of the anchor module 610 and the configured module 620 decides digital subcarrier group allocation based on the carrier frequency f'. In some implementations, the logic of the anchor module 610 and the configured module 620 allocate digital subcarrier groups using the carrier frequency f' as a center frequency of the digital subcarrier groups as described above. In the illustrated implementation, allocation of digital subcarrier groups means the first digital subcarrier group 630 is allocated to carry traffic to and from the first electrical port 88a of the anchor module 610 and the first electrical port 88a1 of the configured module 620, the second subcarrier group 632 is allocated to carry traffic to and from the second electrical port 88b of the anchor module 610 and the second electrical port 88b1 of the configured module 620, the third subcarrier group 634 is allocated to carry traffic to and from the third electrical port 88b of the anchor module 610 and the third electrical port 88b1 of the configured module 620, and the fourth subcarrier group 636 is allocated to carry traffic to and from the fourth electrical port 88d of the anchor module 610 and the fourth electrical port 88d1 of the configured module 620.

In such an implementation, a first traffic stream received at the first host lane 84a and a second traffic stream received at the second host lane 86a that are assigned a first hub-client-Id 88a (client interface number of 1) on the anchor module 610 having a carrier frequency f' of 196.1000 are encoded into the first subcarrier group 630 and routed to the first electrical port 82a1 and host lane 1 (84a1) and host lane 2 (86a1) of the configured module 620. The first digital subcarrier group 630 is associated with the first hub-client-Id 88a and the first configured-client-ID 88a1 so that when data streams are received at host lane 1 (84a1) and host lane 2 (86a1), those data streams are encoded into the subcarrier 0, subcarrier 1, subcarrier 2, and subcarrier 3 of the first digital subcarrier group 630 to be transmitted to the configured module 620 where the first digital subcarrier group 630 is demultiplexed by the multiplexer/demultiplexer 90a and routed to the first electrical register 82a1.

Similarly, a third traffic stream received at the third host lane 84b and a fourth traffic stream received at the fourth host lane 86b are assigned a second hub-client-Id 88d (assigned client interface number 3) and the logic causes the anchor-module-processor 98a of the anchor module 610 to encode the third traffic stream and the fourth traffic stream into the second subcarrier group 632 and route the second subcarrier group 632 to the second electrical port 82b1 and host lane 3 (84b1) and host lane 4 (86b1) based on the second hub-client-Id 88b (client interface number 3); a fifth traffic stream received at the fifth host lane 84c and a sixth traffic stream received at the sixth host lane 86c are assigned a third hub-client-Id 88c (assigned client interface number 5) and the logic causes the anchor-module-processor 98a of the anchor module 610 to encode the fifth traffic stream and the sixth traffic stream into the third subcarrier group 634 and route the third subcarrier group 634 to the third electrical port 82c1 and host lane 5 (84c1) and host lane 6 (86c1) based on the hub-client-ID 88c (client interface number 5); and a seventh traffic stream received at the seventh host lane 84d and an eighth traffic stream received at the eighth host lane 86d are assigned a fourth hub-client-Id 88d (assigned client interface number 7) and the logic causes the anchor-module-processor 98a to encode the seventh traffic stream and the eighth traffic stream into the fourth subcarrier group 636 and route the fourth subcarrier group 636 to the fourth electrical port 82d1 and host lane 7 (84d1) and host lane 8 (86d1) based on the fourth hub-client-Id 88d (client interface number 7).

In the illustrated implementation, the first traffic stream, second traffic stream, third traffic stream, fourth traffic stream, fifth traffic stream, sixth traffic stream, seventh traffic stream, and eighth traffic stream are multiplexed in the multiplexer/demultiplexer 90a of the anchor module 610 and converted into a combined optical data stream by an optical transceiver 92a of the anchor module 610 before being transmitted via the transmission line segment 22, which may be a fiber optic link, the combined optical stream comprising the first digital subcarrier group 630 (comprising digital subcarriers SC0-SC3), the second digital subcarrier group 632 (comprising digital subcarriers SC4-SC7), the third digital subcarrier group 634 (comprising digital subcarriers SC8-SC11), and the fourth digital subcarrier group 636 (comprising digital subcarriers SC12-SC15).

The combined optical data stream may be received by the optical transceiver 92b of the configured module 620, which may convert the incoming combined optical signal to electrical signals equivalent to the first digital subcarrier group 630 (comprising digital subcarriers SC0-SC3), the second digital subcarrier group 632 (comprising digital subcarriers SC4-SC7), the third digital subcarrier group 634 (comprising digital subcarriers SC8-SC11), and the fourth digital subcarrier group 636 (comprising digital subcarriers SC12-SC15), which may be demultiplexed by the multiplexer/demultiplexer 90b of the configured module 620 and routed by the digital cross-connect 625 of the multiplexer/demultiplexer 90b to the electrical ports 82a1-82d1 based on the first through fourth hub-client-Ids 88a-88d mapped from the anchor module 610 as described above.

Likewise, traffic streams travelling from the configured module 620 to the anchor module 610 uses the host-client-IDs to map data streams, encoded into the digital subcarrier groups, between host lanes on the configured module 620 to the mapped host lanes on the anchor module 610.

While the illustrated implementation is shown having four host lane groups each having a supported application instance and an associated host-client-ID 88, it should be noted that in some implementations, each host lane 1-8 may support an application instance and have an associated host-client-ID (e.g., host-client-IDs 1, 3, 5, 7, 9, 11, 13, and 15). In either implementation, a first host lane number of a host lane group supporting an application instance (e.g., "1" of the host lane 1 supporting the first application instance) may be used to assign the host-client-ID 88 (which may be the same as assigning a DataPathID in Staged Configuration Set) which defines the associated service by DataPath Configuration. Host lanes within a host lane group supporting a given application share the same host-client-ID 88. Note that in some implementations, in accordance with the CMIS standard, the host-client-ID number of the first host-client-ID 88 may begin with 0 (000b). Thus, a host lane group including host lane 1 and host lane 2 supporting a first application instance may share the host-client-ID 88 identified as host-client-ID number 0. In such an implementation having eight host lanes, a second host lane group including host lane 3 and host lane 4 may share the host-client-ID 88 identified as host-client-ID number 2, a third host lane group including host lane 5 and host lane 6 may share the host-client-ID 88 identified as host-client-ID number 4, and a fourth host lane group including host lane 7 and host lane 8 may share the host-client-ID 88 identified as host-client-ID number 6.

Figure 7A:
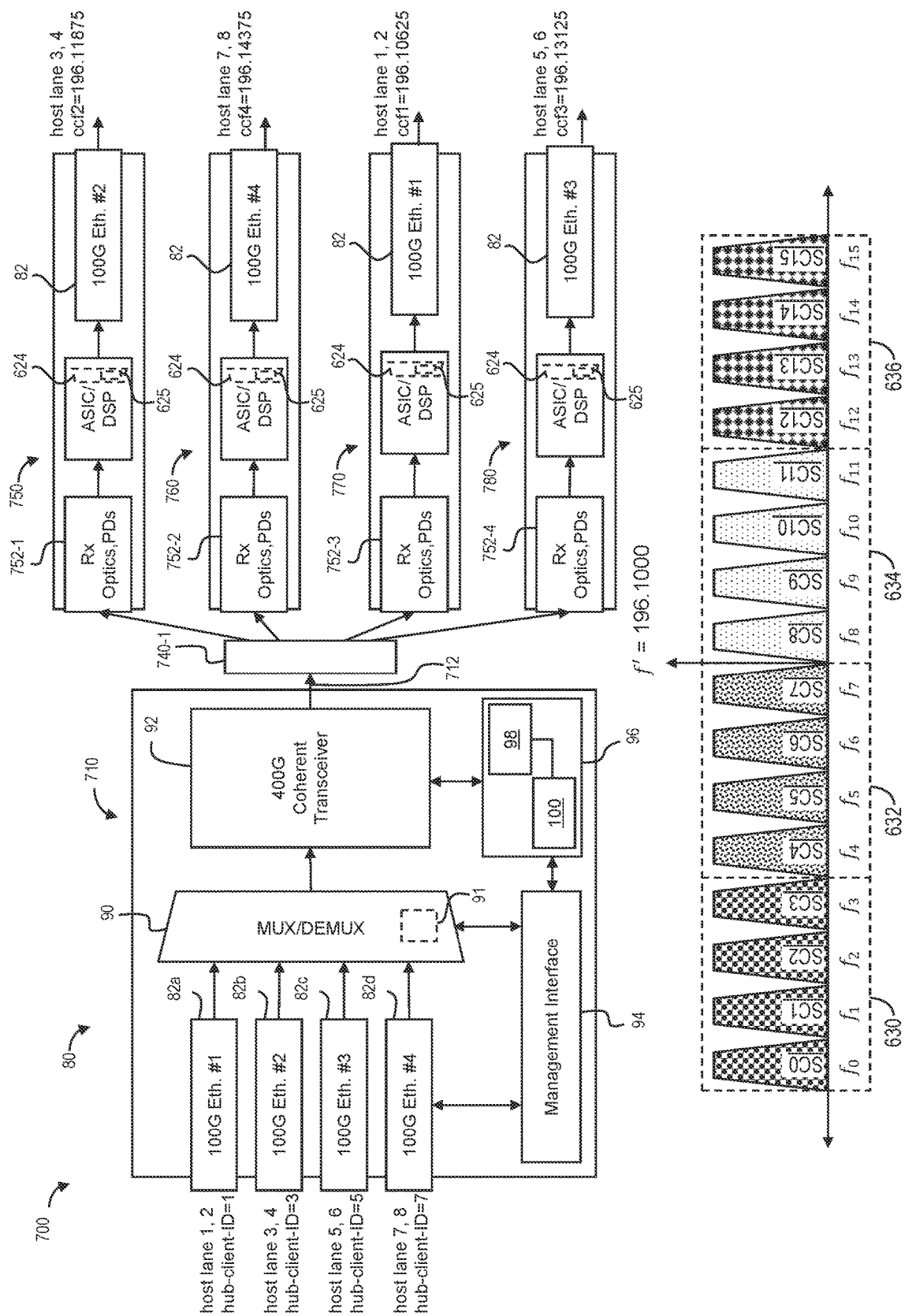

Referring now to FIGS. 7A and 7B, shown therein is an exemplary implementation of a transport network 700. The transport network 700 represents an implementation of a network carrying a point-to-multi-point application with service selecting and lane mapping. The transport network 700 allows point to multi-point networking without requiring a laser for each media lane as required in the prior art (see FIG. 5, for example). The transport network 700 may be provided with an anchor module 710, an optical splitter 740-1 (FIG. 7A) that splits optical transmissions traveling from the anchor module 710 to a first configured module 750, a second configured module 760, a third configured module 770, and a fourth configured module 780, and an optical combiner 740-2 (FIG. 7B) that combines optical signals traveling from the first configured module 750, the second configured module 760, the third configured module 770, and the fourth configured module 780 to the anchor module 710. In the illustrated implementation, each of the first configured module 750, second configured module 760, third configured module 770, and fourth configured module 780 are provided with a receive optical port 752 (752-1-752-4) and a transmission optical port 754 (754-1-754-2).

It will be understood that four configured modules 750-780 are shown for exemplary purposes, but that the transport network 700 may have more or fewer configured modules. The anchor module 710 is similar to network element 14 described above. Therefore, for the sake of brevity, like elements will be numbered the same and only the differences will be described in further detail. The first configured module 750, second configured module 760, third configured module 770, and fourth configured module 780 are simplified in FIGS. 7A and 7B for ease of illustration but may be similar in construction and/or function to muxponder 80. Further, for the sake of illustration the lines representing the host lanes have been omitted and are represented as text.

To determine where to send/receive traffic from, the configured modules must identify the client interface (i.e., the hub-client-ID) on the anchor module 710 associated with the electrical port 82 that is connected to a desired host/client. For the purposes of illustration, a configuration process establishing a connection between the first configured module 750 and the anchor module 710 will be described. However, it should be noted that the same configuration process may be followed by the remaining configured modules 760, 770, 780 or any configured modules that may be connected in the future. Further, while a connection of the first configured module 750 is used for the purposes of illustration, it should be noted that configured modules may be turned up/down in any order.

When the first configured module 750 is connected to the transport network 700, the first configured module 750 and the anchor module 710 communicate over an optical control channel to establish end-to-end (E2E) traffic flows. The anchor module 710 may manage admission of the configured modules, digital subcarrier SC0-SC15 allocation and client mapping (e.g., which digital subcarriers are assigned to carry traffic from which electrical ports), and assignment of client interface numbers to electrical ports. The anchor module 710 may be provided with a digital cross-connect 91 as part of the multiplexer/demultiplexer 90 which may be programmed to encode and decode digital subcarriers and digital subcarrier groups containing the data of the traffic streams.

In one implementation, the first configured module 750 may determine the electrical port on the anchor module 710 to which traffic should be directed. In the illustrated implementation, traffic to and from electrical port 82 on the first configured module 750 may be received from/sent to the second electrical port 82b of the anchor module 710. To accomplish this mapping, the first configured module 750 may determine a calculated carrier frequency (ccf).

The calculated carrier frequency (ccf) may be determined by adding the carrier frequency f of the anchor module 610 (196.1000 will be used for purposes of illustration) to a hub-client-ID (e.g., 1, 3, 5, 7) associated with a desired electrical port (82a-82d) on the anchor module 610 times a frequency offset factor fof (0.00625 will be used for the purposes of illustration). An algorithm to determine the ccf is as follows:

$$ccf = f + (\text{hub-client-ID} \times fof)$$

For example, the anchor module 710 and the first configured module 750 may connect over the optical control channel and determine a carrier frequency f (196.1000 will be used for the sake of illustration) for sending/receiving traffic. The anchor module 710 may also communicate the hub-client-ID number of the second electrical port 82b (3 will be used for illustrative purposes) to the first configured module 750. The first configured module 750 may use the carrier frequency f and the hub-client-ID to determine the ccf (ccf=196.1000+(3×0.00625)). For the purposes of illustration, the ccf will be referred to as ccf1 to differentiate it from the ccfs that are calculated by the other configured modules 760, 770, and 780 using the same method. In this implementation, ccf1 is 196.11875. Using this ccf1, the first configured module 750 determines that traffic to and from the second electrical port 82b will be transmitted/received using the second subcarrier group 632, with the subcarrier group assignment provided by the anchor module 710 as described above.

An illustrative traffic flow will now be described traveling in a "downstream" direction between the anchor module 710 and the first configured module 750. In the illustrated implementation, traffic streams 3 and 4 coming in on host lanes 3 and 4 are received at the second electrical port 82b. Traffic streams 3 and 4 are combined in the multiplexer/demultiplexer 90 and converted to a combined optical signal in the optical transceiver 92 before being transmitted on a first media lane 712. When traffic streams 3 and 4 are combined in the multiplexer/demultiplexer 90, they are encoded into the second subcarrier group 632 while traffic from all other traffic streams 1-2 and 5-8 are encoded into the first subcarrier group 630, the third subcarrier group 634, and the fourth subcarrier group 636.

The combined optical signal (which may be referred to as a downstream combined optical signal) is split by the optical splitter 740-1 into a split optical signal and the split optical signal is transmitted on each of a second media lane 714 to the receive optical port 752-1 of the first configured module 750, a third media lane 716 to the receive optical port 752-2 of the second configured module 760, a fourth media lane 718 to the receive optical port 752-3 of the third configured module 770, and a fifth media lane 720 to the receive optical port 752-4 of the fourth configured module 780. It should be noted that the split optical signal received by each of the first configured module 750, second configured module 760, third configured module 770, and fourth configured module 780 comprises all of the traffic streams 1-8 of the combined optical signal (i.e., the first digital subcarrier group 630, the second digital subcarrier group 632, the third digital subcarrier group 634, and the fourth digital subcarrier group 636).

The receive optical port 752-1 of the first configured module 750 may include a local oscillator laser, optical hybrids, and photodiodes that operate in a known manner to provide electrical signals to an ADC (which may be included in the ASIC), which, in turn, provides digital signals or samples to the DSP which may be referred to as a split digital signal. The split digital signal, still containing the data of all the traffic streams 1-8, is directed to the digital cross-connect 625 of the multiplexer/demultiplexer 90 which may be programmed to demultiplex the split electrical signal and pass the second subcarrier group 632 comprising SC4, SC5, SC6, and SC7 containing the data of traffic streams 3 and 4 through the electrical connection 82 to host lanes 1 and 2 of the first configured module 750. The remaining traffic streams 1-2 and 5-8 (made up of subcarrier groups 630, 634, and 636) are not used by the first configured module 750 and are discarded by the first configured module 750. Similar processes are carried out in each of the second configured module 760 to extract traffic streams 7 and 8 (encoded in fourth subcarrier group 636), the third configured module 770 to extract traffic streams 1 and 2 (encoded first subcarrier group 630), and the fourth configured module 780 to extract traffic streams 5 and 6 (encoded in third subcarrier group 630).

An illustrative traffic flow will now be described travelling in an "upstream" direction between the first configured module 750 and the anchor module 710. In the illustrated implementation, traffic streams 1 and 2 coming in on host lanes 3 and 4 are received at the electrical port 82 of the first configured module 750. Traffic streams 1 and 2 are combined in the multiplexer/demultiplexer 624 and converted to a first combined optical signal in the optical transceiver 752-1 before being transmitted on the second media lane 714. When traffic streams 1 and 2 are combined in the multiplexer/demultiplexer 624, they are encoded into the second subcarrier group 632 based on cff1 determined when the first configured module 750 was connected to the anchor module 710 as described above. Because no other traffic streams are present at the multiplexer/demultiplexer 624 of the first configured module 750, there is nothing encoded in the first subcarrier group 630, the third subcarrier group 634, and the fourth subcarrier group 636 of the first combined optical signal. The first combined optical signal is received at the optical combiner 740-2 and combined with traffic streams from the second configured module 760 (encoded into the fourth subcarrier group 636), the third configured module 770 (encoded into the first subcarrier group 630), and the fourth configured module 780 (encoded into the third subcarrier group 634) into a second combined optical signal, the second combined optical now having data encoded in all of the first subcarrier group 630, the second subcarrier group 632, the third subcarrier group 634, and the fourth subcarrier group 636.

The second combined optical signal (which may be referred to as an upstream combined optical signal) is received by the optical transceiver 92 which may include a local oscillator laser, optical hybrids, and photodiodes that operate in a known manner to provide electrical signals to an ADC (which may be included in the ASIC), which, in turn, provides digital signals or samples to the DSP which may be referred to as a split digital signal. The split digital signal, still containing the data from all of the configured modules 750, 760, 770, and 780, is directed to the digital cross-connect 625 of the multiplexer/demultiplexer 90 which may be programmed, according to CMIS 5.2 or earlier, to demultiplex the split electrical signal and pass the second subcarrier group 632 comprising SC4, SC5, SC6, and SC7 containing the data of traffic streams 1 and 2 from the first configured module through the second electrical connection 82b to host lanes 3 and 4 of the anchor module 710. The remaining traffic streams (made up of subcarrier groups 630, 634, and 636) are directed to their associated electrical connections.

not used by the first configured module 750 and are discarded by the first configured module 750. Similar processes are carried out in each of the second configured module 760 to extract traffic streams 7 and 8 (encoded in fourth subcarrier group 636), the third configured module 770 to extract traffic streams 1 and 2 (encoded first subcarrier group 630), and the fourth configured module 780 to extract traffic streams 5 and 6 (encoded in third subcarrier group 630).

While the first configured module 750, second configured module 760, third configured module 770, and fourth configured module 780 have been illustrated having the receive optical ports 752 and the transmission optical ports 754, in some implementations, the first configured module 750, the second configured module 760, the third configured module 770, and the fourth configured module 780, may be provided with optical transceivers, such as the optical transceiver 92 described above, that perform transmission and receiving functions of optical signals.

In some implementations, the anchor module 710 may be a legacy module that operates using fixed mapping per CMIS 5.2 or earlier standard.

Figure 8:
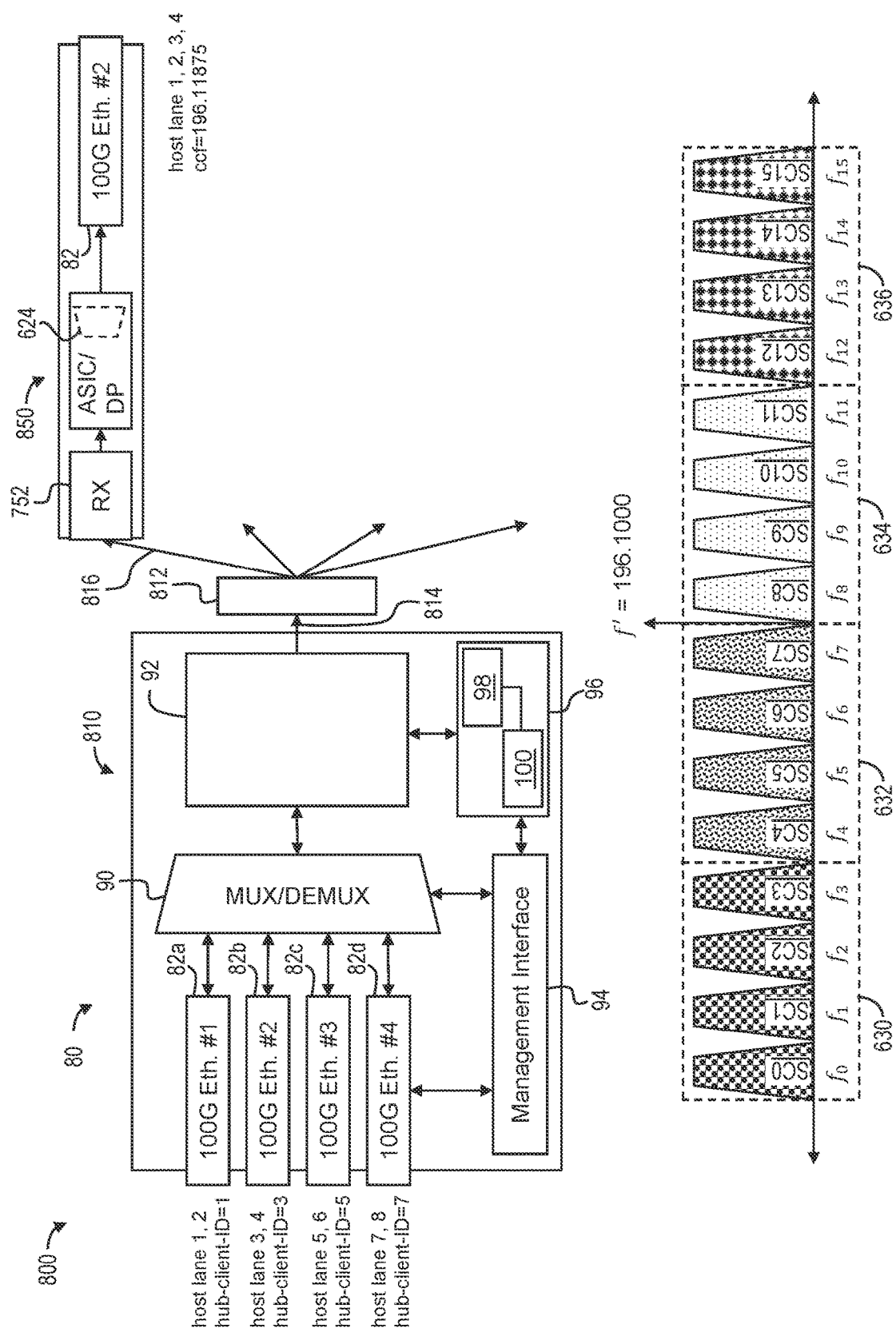
FIG. 8 is a diagram of an exemplary implementation of a transport network with host lanes of different modules having different lane rates constructed in accordance with the present disclosure.

Referring now to FIG. 8, shown therein is an exemplary implementation of another transport network 800. The transport network 800 represents an implementation of a point-to-multi-point network having modules with different lane rates. The transport network 800 may be provided with an anchor module 810, an optical splitter/combiner 812, a first media lane 814, a second media lane 816, and a first configured module 850. It should be noted that the transport network 800 may be provided with a second configured module, a third configured module, and a fourth configured module that are not shown for simplicity. It will be understood that the transport network 800 may have more or fewer configured modules. The anchor module 810 is similar to network element 14 described above. Therefore, for the sake of brevity, like elements will be numbered the same and only the differences will be described in further detail. The first configured module 850 is simplified in FIG. 8 for ease of illustration but may be similar in construction and/or function to the muxponder 80 as shown in FIG. 3 and/or the first configured module 750 as shown in FIGS. 7A and 7B. Further, for the sake of illustration the lines representing the host lanes have been omitted and are represented as text.

In the illustrated implementation, the anchor module 810 and the first configured module 850 have different host lane rates. Specifically, the anchor module 810 is illustrated as a 4×100 gigabit device with eight host lanes each having a 50-gigabit rate. The first configured module 850 is illustrated as a 100-gigabit device with four host lanes each having a 25-gigabit rate. As illustrated in FIG. 8, traffic streams such as traffic streams 3 and 4 may be mapped from host lanes 3 and 4 (each having a 50 gigabit rate) of the anchor module 810 to host lanes 1-4 (each having a 25 gigabit rate) of the first configured module 850, so long as a combined rate of host lanes grouped on the anchor module 810 (e.g., host lanes 3 and 4) and a combined rate of host lanes grouped on the configured module 850 (e.g., host lanes 1-4) are equal.

The transport network 800 is illustrated transmitting signals in one direction (which may be referred to as a "downstream" direction). However, it should be noted that the transport network 800 may transmit signals in an opposite direction (which may be referred to as an "upstream" direction) with the first configured module 850 having similar hardware and functionality as the first configured module 750 described with respect to FIGS. 7A and 7B.

When the first configured module 850 is connected to the transport network 800, the first configured module 850 and the anchor module 810 may communicate over the optical control channel to set up traffic stream routing as described above. In the illustrated implementation, traffic to and from electrical port 82 on the first configured module 850 may come from/be directed to the second electrical port 82b of the anchor module 810. In the illustrated implementation, the anchor module 810 is a legacy module, therefore, the anchor module 810 operates using fixed mapping per the CMIS 5.2 or earlier standard. As a result, it is the first configured module 850 that determines the electrical port on the anchor module to which traffic should be directed. To accomplish this mapping, the first configured module 850 may determine a ccf as described above. For example, the anchor module 810 and the first configured module 850 may connect over the optical control channel and determine a carrier frequency f' (196.1000 will be used for the sake of illustration). The anchor module 810 may also communicate the hub-client-ID number of the second electrical port 82b (3 will be used for illustrative purposes) to the first configured module 850. The first configured module 850 may use the carrier frequency f' and the hub-client-ID to determine a ccf (ccf=196.1000+(3×0.00625). In this implementation, the ccf is 196.11875. Using this ccf, the first configured module 850 determines that traffic to and from the second electrical port 82b should be/will be transmitted using the second subcarrier group 632.

In an illustrative traffic stream flow using the ccf, traffic streams received on host lanes 3 and 4 of the anchor module 810 may be aggregate or multiplexed in the multiplexer/demultiplexer 90 and transmitted via the optical transceiver 92 over the first media lane 814 as a first combined optical signal, with the traffic streams from host lanes 3 and 4 being encoded into the first combined optical signal in the second carrier group 632. It should be noted that traffic streams from host lanes 1-2 and 5-8 may also be encoded into the first combined optical signal in the first subcarrier group 630, the third subcarrier group 634, and the fourth subcarrier group 636, respectively. The first combined optical signal may be split by an optical splitter 812 into a split optical signal and the split optical signal may be transmitted on a second media lane 816 to the optical port 752 of the first configured module 850. It should be noted that the split optical signal received by the first configured module 850 comprises all of the traffic streams 1-8 of the combined optical signal (i.e., the first digital subcarrier group 630, the second digital subcarrier group 632, the third digital subcarrier group 634, and the fourth digital subcarrier group 636).

The receive optical port 752 of the first configured module 850 may include a local oscillator laser, optical hybrids, and photodiodes that operate in a known manner to provide electrical signals to an ADC (which may be included in the ASIC), which, in turn, provides digital signals or samples to the DSP which may be referred to as a split digital signal. The split digital signal, still containing the data of all the traffic streams 1-8, is directed to the digital cross-connect 625 of the multiplexer/demultiplexer 624 which may be programmed to demultiplex the split electrical signal and pass the second subcarrier group 632 comprising SC4, SC5, SC6, and SC7 containing the data of traffic streams 3 and 4 through the electrical connection 82 to host lanes 1, 2, 3, and 4 of the first configured module 850. The remaining traffic streams 1-2 and 5-8 (made up of subcarrier groups 630, 634, and 636) are not used by the first configured module 850 and are discarded by the first configured module 850.

From the above description, it is clear that the inventive concept(s) disclosed herein are well adapted to carry out the objects and to attain the advantages mentioned herein, as well as those inherent in the inventive concept(s) disclosed herein. While the implementations of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. An optical transport network system, comprising:
   an anchor muxponder module, comprising:
      a first electrical port having a first host lane receiving a first traffic stream and a second host lane receiving a second traffic stream, the first host lane having a first electrical register, and the second host lane having a second electrical register;
      a second electrical port having a third host lane receiving a third traffic stream and a fourth host lane receiving a fourth traffic stream, the third host lane having a third electrical register and the fourth host lane having a fourth electrical register;
      wherein the first electrical register of the first host lane and the second electrical register of the second host lane are associated with a first client identification code, and the third electrical register of the third host lane and the fourth electrical register of the fourth host lane are associated with a second client identification code; and
      at least one optical transmitter configured to encode and transmit the first traffic stream, the second traffic stream, the third traffic stream, and the fourth traffic stream at a carrier frequency;
   at least one configured muxponder module comprising:
      at least one optical receiver configured to receive and decode the first traffic stream, the second traffic stream, the third traffic stream, and the fourth traffic stream transmitted at the carrier frequency;
      a first configured electrical port having a first configured host lane associated with a first configured electrical register and a second configured host lane associated with a second configured electrical register;
      a second configured electrical port having a third configured host lane associated with a third configured electrical register and a fourth configured host lane associated with a fourth configured electrical register;
      a digital cross-connect;
      a configured memory storing a first calculated carrier frequency assigned to the first configured electrical port and a second calculated carrier frequency assigned to the second configured electrical port; and
      a configured-module-processor accessing logic to control the digital cross-connect to route the first traffic stream and the second traffic stream to the first configured electrical port based on the first calculated carrier frequency, and the third traffic stream and the fourth traffic stream to the second configured electrical port based on the second calculated carrier frequency; and a fiber optic link connecting the least one optical transmitter of the anchor module to the at least one optical receiver of the configured module, wherein said fiber optic link is configured to transmit the first traffic stream, the second traffic stream, the third traffic stream, and the fourth traffic stream.

2. The system of claim 1, wherein the anchor muxponder module further comprises:

a third electrical port having a fifth host lane receiving a fifth traffic stream and a sixth host lane receiving a sixth traffic stream, the fifth host lane having a fifth electrical register, and the sixth host lane having a sixth electrical register, wherein the fifth electrical register of the fifth host lane and the sixth electrical register of the sixth host lane are associated with a third client identification code; and a fourth electrical port having a seventh host lane receiving a seventh traffic stream and an eighth host lane receiving an eighth traffic stream, the seventh host lane having a seventh electrical register and the eighth host lane having an eighth electrical register, wherein the seventh electrical register of the seventh host lane and the eighth electrical register of the eighth host lane are associated with a fourth client identification code; and wherein the at least one configured muxponder module further comprises:

a third configured electrical port having a fifth configured host lane associated with a fifth configured electrical register and a sixth configured host lane associated with a sixth configured electrical register;

a fourth configured electrical port having a seventh configured host lane associated with a seventh configured electrical register and an eighth configured host lane associated with an eighth configured electrical register;

wherein the configured memory further stores a third calculated carrier frequency assigned to the third configured electrical port and a fourth calculated carrier frequency assigned to the fourth configured electrical port and the configured-module-processor further accesses logic to control the digital cross-connect to route the fifth traffic stream and the sixth traffic stream to the third configured electrical port based on the third calculated carrier frequency, and the seventh traffic stream and the eighth traffic stream to the fourth configured electrical port based on the fourth calculated carrier frequency.

3. The system of claim 1, wherein the at least one optical receiver comprises a first optical receiver and a second optical receiver, and wherein the at least one configured muxponder module comprises:

a first configured muxponder module comprising the first optical receiver, a first digital cross-connect, the first electrical port, a first configured memory storing the first calculated carrier frequency, and a first configured-module-processor accessing first logic to control the first digital cross-connect to route the first traffic stream and the second traffic stream to the first configured electrical port based on the first calculated carrier frequency; and a second configured muxponder module comprising the second configured optical receiver, a second digital cross-connect, the second configured electrical port, a second configured memory storing the second calculated carrier frequency, and a second configured-module-processor accessing second logic to control the second digital cross-connect to route the third traffic stream and the fourth traffic stream to the second configured electrical port based on the second calculated carrier frequency.

4. The system of claim 3, wherein the anchor muxponder module further comprises a multiplexer, the multiplexer configured to combine the first traffic stream, the second traffic stream, the third traffic stream, and the fourth traffic stream as a combined digital signal and pass the combined digital signal to the at least one optical transmitter, the at least one optical transmitter configured to convert the combined digital signal to at least one combined optical signal and provide the at least one combined optical signal to the fiber optic link.

5. The system of claim 4, wherein the combined digital signal comprises a first digital subcarrier group and a second digital subcarrier group, the first traffic stream and the second traffic stream encoded into the first digital subcarrier group and the third traffic stream and the fourth traffic stream encoded into the second digital subcarrier group.

6. The system of claim 5, further comprising an optical splitter connected to the fiber optic link, the optical splitter configured to receive the at least one combined optical signal from the at least one optical transmitter and split the at least one combined optical signal to form at least one split optical signal.

7. The system of claim 6, wherein the first configured muxponder module further comprises a first demultiplexer, the second configured muxponder module further comprises a second demultiplexer, and the at least one split optical signal comprises a first split optical signal directed to the first configured muxponder module and a second split optical signal direct to the second configured muxponder module, each of the first split optical signal and the second split optical signal comprising the first digital subcarrier group comprising the first traffic stream and the second traffic stream, and the second digital subcarrier group comprising the third traffic stream and the fourth traffic stream;

wherein the first configured muxponder module is configured to receive, at the first optical receiver, the first split optical signal, convert the first split optical signal to a first split digital signal and pass the first split digital signal to the first configured demultiplexer and demultiplex, with the first demultiplexer the first split digital signal into the first digital subcarrier group comprising the first traffic stream and the second traffic stream, and the second digital subcarrier group comprising the third traffic stream and the fourth traffic stream, and route, with the first digital cross connect accessing the first calculated carrier frequency, the first traffic stream and the second traffic stream to the first configured electrical port and discard the third traffic stream and the fourth traffic stream; and wherein the second configured muxponder module is configured to receive, at the second optical receiver, the second split optical signal, convert the second split optical signal to a second split digital signal and pass the second split digital signal to the second configured demultiplexer and demultiplex, with the second demultiplexer the second split optical signal into the first digital subcarrier group comprising the first traffic stream and the second traffic stream, and the second digital subcarrier group comprising the third traffic stream and the fourth traffic stream, and route, with the second digital cross connect accessing the second calculated carrier frequency, the third traffic stream and the fourth traffic stream to the second configured electrical port and discard the first traffic stream and the second traffic stream.

8. A system, comprising:
a configured muxponder module, comprising:
an optical receiver configured to receive a combined optical signal comprising a first traffic stream, a second traffic stream, a third traffic stream, and a fourth traffic stream transmitted on a carrier frequency, the first traffic stream and the second traffic stream transmitted from a first electrical port having a first client identification code, and the third traffic stream and the fourth traffic stream transmitted from a second electrical register having a second client identification code, the optical receive configured to convert the combined optical signal to a combined digital signal;
a first configured electrical port having a first configured host lane associated with a first configured electrical register and a second configured host lane associated with a second configured electrical register;
a second configured electrical port having a third configured host lane associated with a third configured electrical register and a fourth configured host lane associated with a fourth configured electrical register;
a demultiplexer having a built-in digital cross-connect configured to demultiplex the combined digital signal into the first traffic stream, the second traffic stream, the third traffic stream, and the fourth traffic stream;
a configured memory storing a first calculated carrier frequency assigned to the first configured electrical port and a second calculated carrier frequency assigned to the second configured electrical port; and
a configured-module-processor accessing logic to control the digital cross-connect to route the first traffic stream and the second traffic stream to the first configured electrical port based on the first calculated carrier frequency, and the third traffic stream and the fourth traffic stream to the second configured electrical port based on the second calculated carrier frequency.

9. The system of claim 8, further comprising an anchor muxponder module, comprising:
a first electrical port having a first host lane receiving the first traffic stream and a second host lane receiving the second traffic stream, the first host lane having a first electrical register, and the second host lane having a second electrical register;
a second electrical port having a third host lane receiving the third traffic stream and a fourth host lane receiving the fourth traffic stream, the third host lane having a third electrical register and the fourth host lane having a fourth electrical register;
wherein the first electrical register of the first host lane and the second electrical register of the second host lane are associated with a first client identification code, and the third electrical register of the third host lane and the fourth electrical register of the fourth host lane are associated with a second client identification code; and at least one optical transmitter configured to transmit the first traffic stream, the second traffic stream, the third traffic stream, and the fourth traffic stream as the combined optical signal.

10. The system of claim 9, wherein the anchor muxponder module further comprises a multiplexer, the multiplexer configured to combine the first traffic stream, the second traffic stream, the third traffic stream, and the fourth traffic into a combined digital signal and pass the combined digital signal to the at least one optical transmitter, the at least one optical transmitter configured to convert the combined digital signal to the combined optical signal and provide the combined optical signal to a fiber optic link.

11. The system of claim 10, further comprising an optical splitter connected to the fiber optic link, the optical splitter configured to receive the combined optical signal from the at least one optical transmitter and split the combined optical signal to form at least one split optical signal.

12. The system of claim 9, wherein the anchor muxponder module further comprises:
a third electrical port having a fifth host lane receiving a fifth traffic stream and a sixth host lane receiving a sixth traffic stream, the fifth host lane having a fifth electrical register, and the sixth host lane having a sixth electrical register, wherein the fifth electrical register of the fifth host lane and the sixth electrical register of the sixth host lane are associated with a third client identification code;
a fourth electrical port having a seventh host lane receiving a seventh traffic stream and an eighth host lane receiving an eighth traffic stream, the seventh host lane having a seventh electrical register and the eighth host lane having an eighth electrical register, wherein the seventh electrical register of the seventh host lane and the eighth electrical register of the eighth host lane are associated with a fourth client identification code; and
wherein the configured muxponder module further comprises:
a third configured electrical port having a fifth configured host lane associated with a fifth configured electrical register and a sixth configured host lane associated with a sixth configured electrical register;
a fourth configured electrical port having a seventh configured host lane associated with a seventh configured electrical register and an eighth configured host lane associated with an eighth configured electrical register; and
wherein the configured memory further stores a third calculated carrier frequency assigned to the third configured electrical port and a fourth calculated carrier frequency assigned to the fourth configured electrical port and the configured-module-processor further accesses logic to control the digital cross-connect to route the fifth traffic stream and the sixth traffic stream to the third configured electrical port based on the third calculated carrier frequency, and the seventh traffic stream and the eighth traffic stream to the fourth configured electrical port based on the fourth calculated carrier frequency.

13. The system of claim 12, wherein the anchor muxponder module further comprises a multiplexer, the multiplexer configured to combine the first traffic stream, the second traffic stream, the third traffic stream, the fourth traffic stream, the fifth traffic stream, the sixth traffic stream, the seventh traffic stream, and the eighth traffic stream into a combined digital signal and pass the combined digital signal to the at least one optical transmitter, the at least one optical transmitter configured to convert the combined digital signal to the combined optical signal and provide the combined optical signal to a fiber optic link.

14. The system of claim 13, wherein the combined digital signal comprises a first digital subcarrier group, a second digital subcarrier group, a third digital subcarrier group, and a fourth digital subcarrier group, the first traffic stream and the second traffic stream encoded into the first digital subcarrier group, the third traffic stream and the fourth traffic stream encoded into the second digital subcarrier group, the fifth traffic stream and the sixth traffic stream encoded into the third digital subcarrier group, and the seventh traffic stream and the eighth traffic stream encoded into the fourth digital subcarrier group.

15. The system of claim 14, further comprising an optical splitter connected to the fiber optic link, the optical splitter configured to receive the combined optical signal from the at least one optical transmitter and split the combined optical signal to form at least one split optical signal.

16. The system of claim 15, wherein the configured muxponder module is a first configured muxponder module and the system further comprises a second configured muxponder module, and wherein the at least one split optical signal comprises a first split optical signal directed to the first configured muxponder module and a second split optical signal directed to the second configured muxponder module.

17. An optical transport network system, comprising:
an anchor muxponder module, comprising:
a first electrical port having a first host lane receiving a first traffic stream and a second host lane receiving a second traffic stream, the first host lane having a first electrical register, and the second host lane having a second electrical register;
a second electrical port having a third host lane receiving a third traffic stream and a fourth host lane receiving a fourth traffic stream, the third host lane having a third electrical register and the fourth host lane having a fourth electrical register;
wherein the first electrical register of the first host lane and the second electrical register of the second host lane are associated with a first client identification code, and the third electrical register of the third host lane and the fourth electrical register of the fourth host lane are associated with a second client identification code;
an anchor module digital cross-connect;
an anchor module processor configured to cause the anchor module digital cross-connect to encode the first traffic stream and the second traffic stream into digital subcarriers of a first digital subcarrier group based on the first client identification code and an assigned carrier frequency and encode the third traffic stream and the fourth traffic stream into digital subcarriers of a second digital subcarrier group based on the second client identification code and the assigned carrier frequency into a digital signal; and
at least one optical transmitter configured to encode the digital signal containing the first digital subcarrier group and the second digital subcarrier group into an optical signal and transmit the optical signal at the assigned carrier frequency;
at least one configured muxponder module comprising:
a first configured electrical port having a first configured host lane associated with a first configured electrical register and a second configured host lane associated with a second configured electrical register;
a second configured electrical port having a third configured host lane associated with a third configured electrical register and a fourth configured host lane associated with a fourth configured electrical register;
at least one optical receiver configured to receive the optical signal transmitted at the assigned carrier frequency and decode the optical signal into a second digital signal;
a configured muxponder digital cross-connect;
a configured-module-processor accessing logic to control the configured muxponder digital cross-connect to decode the second digital signal into the first digital subcarrier group containing the first traffic stream and the second traffic stream and the second digital subcarrier group containing the third traffic stream and the fourth traffic stream and route the first traffic stream and the second traffic stream to the first configured electrical port based on the first client identification code and the assigned carrier frequency, and the third traffic stream and the fourth traffic stream to the second configured electrical port based on the second client identification code and the assigned carrier frequency; and
a fiber optic link connecting the least one optical transmitter of the anchor module to the at least one optical receiver of the configured module, wherein said fiber optic link is configured to transmit the optical signal.

18. The optical transport network system of claim 17, wherein the assigned carrier frequency is a center frequency of the first digital subcarrier group and the second digital subcarrier group.

19. The optical transport network system of claim 17, wherein the digital subcarriers of the first subcarrier group are transmitted at a frequency below the assigned carrier frequency and the digital subcarriers of the second subcarrier group are transmitted at a frequency above the assigned carrier frequency.

20. The optical transport network system of claim 17, wherein first digital subcarrier group comprises four digital subcarriers and the second digital subcarrier group comprises four digital subcarriers.

* * * * *